United States Patent
Fang

(10) Patent No.: US 11,303,526 B2
(45) Date of Patent: Apr. 12, 2022

(54) NETWORK SLICE DEPLOYMENT METHOD AND APPARATUS

(71) Applicant: HUAWEI TECHNOLOGIES CO., LTD., Shenzhen (CN)

(72) Inventor: Haipeng Fang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 16/924,487

(22) Filed: Jul. 9, 2020

(65) Prior Publication Data

US 2020/0344126 A1    Oct. 29, 2020

Related U.S. Application Data

(63) Continuation of application No. PCT/CN2019/071540, filed on Jan. 14, 2019.

(30) Foreign Application Priority Data

Jan. 12, 2018    (CN) .......................... 201810033638.3

(51) Int. Cl.
*H04L 12/24*    (2006.01)
*H04W 28/16*    (2009.01)
(Continued)

(52) U.S. Cl.
CPC ...... *H04L 41/0893* (2013.01); *H04L 41/0803* (2013.01); *H04W 28/16* (2013.01)

(58) Field of Classification Search
CPC ........... H04L 41/0893; H04L 41/0803; H04W 28/16; H04W 48/18; H04W 24/02; H04W 48/06
See application file for complete search history.

(56) References Cited

U.S. PATENT DOCUMENTS

2017/0303259 A1    10/2017    Lee et al.
2019/0357129 A1*   11/2019    Park ...................... H04W 48/18
(Continued)

FOREIGN PATENT DOCUMENTS

CN    106549806 A    3/2017
CN    106982458 A    7/2017
(Continued)

OTHER PUBLICATIONS

Nokia et al., "TS 23.501 OI:4f Coexistence and isolation among network slices", 3GPP TSG SA WG2 Meeting #124, Reno, Nevada, USA, Nov. 27-Dec. 1, 2017, S2-178541, 7 pages.
(Continued)

*Primary Examiner* — Walli Z Butt
*Assistant Examiner* — Shawn D Miller
(74) *Attorney, Agent, or Firm* — Maier & Maier, PLLC

(57) ABSTRACT

Embodiments provide a network slice deployment method and apparatus. The method includes: obtaining slice coexistence relationship information of a first network slice, where the slice coexistence relationship information is used to indicate information about a second network slice that has a slice coexistence relationship with the first network slice; determining, based on the slice coexistence relationship information, a deployment mode of a network function entity required by the first network slice; and deploying the network function entity in the deployment mode. According to the embodiments, in a scenario in which one terminal device simultaneously accesses a plurality of network slices, how to deploy a network function entity shared by the plurality of network slices can be clearly learned, thereby improving network slice management efficiency.

14 Claims, 11 Drawing Sheets

(51) Int. Cl.
*H04L 41/0893* (2022.01)
*H04L 41/0803* (2022.01)

(56) References Cited

U.S. PATENT DOCUMENTS

2020/0113001 A1* 4/2020 Shimojou .............. H04W 76/10
2021/0037026 A1* 2/2021 Saarinen ............. H04L 63/0464
2021/0153111 A1* 5/2021 Theimer ............... H04W 88/06

FOREIGN PATENT DOCUMENTS

| CN | 107332750 A | 11/2017 |
| EP | 3442281 A1 | 2/2019 |
| EP | 3512233 A1 | 7/2019 |
| WO | 2017/096606 A1 | 6/2017 |
| WO | 2017175715 A1 | 10/2017 |
| WO | 2018058579 A1 | 4/2018 |

OTHER PUBLICATIONS

Mediatek Inc.,"OI4f—On co-existence rules for network slices", SA WG2 Meeting #124, Reno (USA), Nov. 27-Dec. 1, 2017, S2-178847, 3 pages.
Samsung, Interdigital,"TS 23.501: Slice coexistence—isolated slices", SA WG2 Meeting #122, Jun. 26-30, 2017, San Jose del Cabo, Mexico, S2-174649, 3 pages.
3GPP TS 23.501 V15.0.0 (Dec. 2017), 3rd Generation Partnership Project;Technical Specification Group Services and System Aspects; System Architecture for the 5G System; Stage 2(Release 15), 181 pages.
Qualcomm Incorporated et al. "TS 23.501: Slice co-existence and conflicting S-NSSAIs." SA WG2 Meeting #121 S2-173103. May 15-19, 2017. Hangzhou, P.R. China. 8 pages.

* cited by examiner

NETWORK SLICE DEPLOYMENT METHOD AND APPARATUS

CROSS-REFERENCE TO RELATED APPLICATIONS

This application is a continuation of International Application No. PCT/CN2019/071540, filed on Jan. 14, 2019, which claims priority to Chinese Patent Application No. 201810033638.3, filed on Jan. 12, 2018. The disclosures of the aforementioned applications are hereby incorporated by reference in their entireties.

TECHNICAL FIELD

Embodiments relate to the field of communications technologies, and specifically, to a network slice deployment method and apparatus.

BACKGROUND

With continuous emergence of various communication services, different communication services have highly distinctive requirements for network performance A concept of a network slice is introduced into a 5th generation (5G) mobile communications system, to meet different requirements of different communication services for network performance.

Network slicing refers to customization of different logical networks on a physical or virtual network infrastructure based on different service requirements. A network slice is a combination of a network function set and a resource that are required by a type of user or some services. One network slice is a complete logical network that can provide a communication service and has a specific network capability. The network slice may include a radio access network (RAN) and a core network. Basic network slice types include an enhanced mobile broadband (eMBB) network slice, a massive machine-type communications (mMTC) network slice, and an ultra-reliable low latency communication (URLLC) network slice.

A network slice instance (NSI) is an actively operating logical network, and can meet a specific network feature or service requirement. A complete network slice instance can provide a complete end-to-end network service, and the network slice instance may include several network slice subnet instances (NSSI) and/or several network functions (NF).

In actual application, there may be a scenario in which one terminal device (for example, user equipment (UE)) accesses one network slice. For a manner in which one terminal device accesses only one network slice based on subscription information, refer to an example diagram shown in FIG. 1a. In this case, access and mobility management functions (AMF) included in a plurality of network slices may be independently deployed. In other words, the plurality of network slices do not need to be deployed in a shared manner. Alternatively, the AMFs may be deployed in a shared manner. In actual application, there may also be a scenario in which one terminal device accesses a plurality of network slices. For example, in an internet of vehicles scenario, a vehicle-mounted terminal needs to access the eMBB network slice and the URLLC network slice simultaneously, to obtain a large-broadband entertainment service by accessing the eMBB network slice, and obtain an assisted automated driving service or the like by accessing the URLLC network slice. For a manner in which one terminal device simultaneously accesses a plurality of network slices, refer to an example diagram shown in FIG. 1b. In this case, the plurality of network slices that are simultaneously accessed by the terminal device have to share an AMF.

In the scenario in which one terminal device accesses one network slice, an AMF instance in a network slice instance may be shared with another network slice or may be a dedicated AMF instance. In the scenario in which one terminal device simultaneously accesses a plurality of network slices, a plurality of network slice instances have to share an AMF instance. In other words, the plurality of network slice instances have to provide an access service for the terminal device through the same AMF instance.

In the scenario in which one terminal device simultaneously accesses a plurality of network slices, how to deploy a network function entity (for example, an AMF instance) shared by the plurality of network slices is an urgent problem which needs to be resolved.

SUMMARY

Embodiments provide a network slice deployment method and apparatus. In a scenario in which one terminal device simultaneously accesses a plurality of network slices, how to deploy a network function entity shared by the plurality of network slices can be clearly learned, thereby improving network slice management efficiency.

According to a first aspect of the embodiments, a network slice deployment method is provided, and the method includes:

obtaining slice coexistence relationship information of a first network slice, where the slice coexistence relationship information is used to indicate information about a second network slice that has a slice coexistence relationship with the first network slice;

determining, based on the slice coexistence relationship information, a deployment mode of a network function entity required by the first network slice; and deploying the network function entity required by the first network slice in the determined deployment mode.

In the first aspect, the first network slice may be any one of a plurality of coexistence slices. The deployment mode of the network function entity required by the first network slice is determined based on the slice coexistence relationship information of the first network slice, and the network function entity is deployed in the determined deployment mode. Therefore, in a scenario in which a plurality of coexistence slices exist, that is, in a scenario in which one terminal device simultaneously accesses a plurality of network slices, how to deploy a network function entity shared by the plurality of network slices can be clearly learned, thereby improving network slice management efficiency.

With reference to the first aspect, in a possible implementation, the network function entity required by the first network slice is a network function entity that needs to be shared by a plurality of network slices that are simultaneously accessed by one terminal device, and may be a mobility management network element. The mobility management network element is configured to provide an access and mobility management service. The mobility management network element may be an AMF entity in a 5G system, or may be a mobility management entity in a 4G system, or may be a mobility management network element in a future communications system. According to the method provided in the first aspect, in the scenario in which one terminal device simultaneously accesses a plurality of network slices, how to deploy a mobility management network element shared by the plurality of network slices can be clearly learned. It may be understood that the mobility management network element is obtained through instantiation, and is a mobility management instance.

With reference to the first aspect, in a possible implementation, the method provided in the first aspect is performed by a network slice management function (NSMF) entity. The NSMF entity obtains the slice coexistence relationship information of the first network slice from a communication service management function (CSMF) entity or another entity. When the deployment mode of the mobility management network element required by the first network slice is determined by the NSMF entity, the mobility management network element is deployed in the determined deployment mode. In other words, the NSMF entity determines the deployment mode of the mobility management network element.

If the deployment mode is a creation mode, that is, the mobility management network element needs to be instantiated, the NSMF entity sends a network slice subnet instantiation requirement to a network slice subnet management function (NSSMF) entity. When receiving the network slice subnet instantiation requirement, the NSSMF entity sends a network service instantiation requirement to a management and orchestration entity. The procedure is an existing procedure for instantiating a network slice.

If the deployment mode is a sharing mode, that is, the mobility management network element does not need to be created, and an existing mobility management network element may be used, the NSMF entity searches for instantiation information (including an instance identifier) of the mobility management network element, and sends a network slice subnet instantiation requirement to the NSSMF entity, where the network slice subnet instantiation requirement carries the instantiation information of the mobility management network element. When receiving the network slice subnet instantiation requirement, the NSSMF entity sends a network service instantiation requirement to a management and orchestration entity, where the network service instantiation requirement carries the instantiation information of the mobility management network element. The management and orchestration entity may search for the mobility management network element based on the instance identifier of the mobility management network element and does not need to perform virtual resource instantiation on the mobility management network element. For example, the first network slice requires a network function entity A, a network function entity B, and the mobility management network element. The management and orchestration entity performs virtual resource instantiation to instantiate the network function entity A and the network function entity B, and searches for the mobility management network element based on the instance identifier of the mobility management network element. Then the management and orchestration entity feeds back the network function entity A, the network function entity B, the instance identifier of the mobility management network element, and a virtualized network function descriptor (VNFD) to the NSSMF entity. The NSSMF entity establishes a network topology between the network function entity A, the network function entity B, and the mobility management network element based on the VNFD. In other words, creation of a mobility management network element is not required in the procedure. This can improve utilization of the network function entity, and help improve network slice management efficiency.

With reference to the first aspect, in a possible implementation, the method provided in the first aspect is performed by the NSSMF entity. The NSSMF entity obtains the slice coexistence relationship information of the first network slice from the NSMF entity. When the deployment mode of the mobility management network element required by the first network slice is determined by the NSSMF entity, the mobility management network element is deployed in the determined deployment mode. In other words, the NSSMF entity determines the deployment mode of the mobility management network element.

If the deployment mode is a creation mode, that is, the mobility management network element needs to be instantiated, the NSSMF entity sends the network service instantiation requirement to the management and orchestration entity when receiving the network slice subnet instantiation requirement sent by the NSMF entity. The procedure is an existing procedure for instantiating a network slice subnet.

If the deployment mode is a sharing mode, that is, creation of the mobility management network element is not required, the NSSMF entity searches for the instantiation information (including the instance identifier) of the mobility management network element, and sends the network service instantiation requirement to the management and orchestration entity, where the network service instantiation requirement carries the instantiation information of the mobility management network element. The management and orchestration entity may search for the mobility management network element based on the instance identifier of the mobility management network element, and does not need to perform virtual resource instantiation on the mobility management network element. For example, the first network slice requires the network function entity A, the network function entity B, and the mobility management network element. The management and orchestration entity performs virtual resource instantiation to instantiate the network function entity A and the network function entity B, and searches for the mobility management network element based on the instance identifier of the mobility management network element. Then the management and orchestration entity feeds back the network function entity A, the network function entity B, the instance identifier of the mobility management network element, and the VNFD to the NSSMF entity. The NSSMF entity establishes a network topology between the network function entity A, the network function entity B, and the mobility management network element based on the VNFD. In other words, creation of a mobility management network element is not required in the procedure. This can improve utilization of the network function entity, and help improve network slice management efficiency.

With reference to the first aspect, in a possible implementation, the slice coexistence relationship information includes a coexistence network slice type list, and the coexistence network slice type list includes a slice type of a second network slice that has a slice coexistence relationship with the first network slice. Slice types include an eMBB network slice, an mMTC network slice, and a URLLC network slice. The slice coexistence relationship information carries the coexistence network slice type list, and may search for a network slice instance corresponding to the slice type of the second network slice in a network, and further determine the deployment mode of the mobility management network element required by the first network slice.

With reference to the first aspect, in a possible implementation, the coexistence network slice type list further includes a tenant identifier of the second network slice that is used to identify a subscriber of the second network slice. When the coexistence network slice type list includes the slice type and the tenant identifier of the second network slice, a network slice deployment apparatus may search at a finer granularity based on the slice type and the tenant identifier of the second network slice, to search for the network slice instance corresponding to the slice type of the second network slice, where the tenant identifier of the network slice instance is the same as the tenant identifier in the coexistence network slice type list.

With reference to the first aspect, in a possible implementation, the deployment mode of the mobility management network element required by the first network slice is determined by determining whether the network slice instance corresponding to the slice type of the second network slice exists. The network slice deployment apparatus may determine whether the network slice instance corresponding to the slice type of the second network slice exists in the network slice deployment apparatus, or may determine whether the network slice instance corresponding to the slice type of the second network slice exists in the network.

When the network slice instance corresponding to the slice type of the second network slice exists, the network slice deployment apparatus determines that the deployment mode of the mobility management network element required by the first network slice is a sharing mode.

Alternatively, when the network slice instance corresponding to the slice type of the second network slice does not exist, the network slice deployment apparatus determines that the deployment mode of the mobility management network element required by the first network slice is a creation mode.

With reference to the first aspect, in a possible implementation, the slice coexistence relationship information includes the coexistence network slice type list and a coexistence network slice instance list. The coexistence network slice instance list includes a network slice instance identifier corresponding to the existing second network slice that has a slice coexistence relationship with the first network slice, and the identifier is used to identify the network slice instance corresponding to the existing second network slice. The slice coexistence relationship information carries the coexistence network slice type list and the coexistence network slice instance list, to search for a network slice instance that can be shared by the first network slice, and further determine the deployment mode of the mobility management network element required by the first network slice.

With reference to the first aspect, in a possible implementation, when the coexistence network slice instance list is empty, it may be understood that the first network slice is the first network slice in the plurality of coexistence slices, and the network slice deployment apparatus determines, based on the coexistence network slice type list, whether a coexistence network slice instance exists. The network slice deployment apparatus may determine whether the coexistence network slice instance exists in the network slice deployment apparatus, or may determine whether the coexistence network slice instance exists in the network. The coexistence network slice instance may support sharing of the mobility management network element by the first network slice.

When the coexistence network slice instance exists, the network slice deployment apparatus determines that the deployment mode of the mobility management network element required by the first network slice is a sharing mode.

When the coexistence network slice instance does not exist, the network slice deployment apparatus determines that the deployment mode of the mobility management network element required by the first network slice is a creation mode.

There is one coexistence network slice instance by default. If there are two or more coexistence network slice instances, the network slice deployment apparatus needs to determine whether these coexistence network slice instances share a mobility management network element. If these coexistence network slice instances share a mobility management network element, the network slice deployment apparatus determines that the deployment mode of the mobility management network element required by the first network slice is a sharing mode.

With reference to the first aspect, in a possible implementation, when the coexistence network slice instance list includes at least two network slice instance identifiers, it may be understood that the first network slice is not the first network slice in the plurality of coexistence slices. The network slice deployment apparatus determines whether at least two network slice instances corresponding to the at least two network slice instance identifiers share a mobility management network element, that is, determines whether mobility management network elements of the at least two network slice instances are the same.

When the at least two network slice instances share the mobility management network element, the network slice deployment apparatus determines whether the mobility management network element shared by the at least two network slice instances supports a slice type of the first network slice. When the slice type of the first network slice is supported, the network slice deployment apparatus determines that the deployment mode of the mobility management network element required by the first network slice is a sharing mode.

When the mobility management network element shared by the at least two network slice instances does not support the slice type of the first network slice, the network slice deployment apparatus sends a failure message that carries a failure cause.

With reference to the first aspect, in a possible implementation, when the coexistence network slice instance list includes one network slice instance identifier, it may be understood that the first network slice is not the first network slice in the plurality of coexistence slices. The network slice deployment apparatus determines whether a mobility management network element of a network slice instance corresponding to the network slice instance identifier supports a slice type of the first network slice. When the slice type of the first network slice is supported, the network slice deployment apparatus determines that the deployment mode of the mobility management network element required by the first network slice is a sharing mode.

When the mobility management network element of the network slice instance does not support the slice type of the first network slice, the network slice deployment apparatus sends a failure message that carries a failure cause.

With reference to the first aspect, in a possible implementation, if the network slice deployment apparatus is the NSMF entity, the failure message that carries a failure cause is sent to the CSMF entity, so that the CSMF entity obtains the failure cause. If the network slice deployment apparatus is the NSSMF entity, the failure message that carries a failure cause is sent to the NSMF entity. When receiving the failure message, the NSMF entity sends the failure message to the CSMF entity, so that the CSMF entity obtains the failure cause.

With reference to the first aspect, in a possible implementation, the network slice deployment apparatus may further obtain a network slice isolation flag of the first network slice, where the network slice isolation flag is used to indicate that a network function instance, other than the mobility management network element, included in a first network slice instance needs to be created, so that the new network function instance is created.

According to a second aspect of the embodiments, a network slice deployment apparatus is provided. The network slice deployment apparatus has a function of implementing the method provided in the first aspect. The function may be implemented by hardware or may be implemented by hardware executing corresponding software. The hardware or the software includes one or more modules corresponding to the foregoing function.

In a possible implementation, the network slice deployment apparatus includes: a transceiver unit, configured to obtain slice coexistence relationship information of a first network slice, where the slice coexistence relationship information is used to indicate information about a second network slice that has a slice coexistence relationship with the first network slice; and a processing unit, configured to determine, based on the slice coexistence relationship information, a deployment mode of a network function entity required by the first network slice, where the processing unit is further configured to deploy the network function entity in the deployment mode.

In a possible implementation, the network slice deployment apparatus includes a processor, a transceiver, and a memory. The memory stores a computer program, where the computer program includes a program instruction. The processor is configured to invoke program code to perform the following operations: controlling the transceiver to obtain slice coexistence relationship information of a first network slice, where the slice coexistence relationship information is used to indicate information about a second network slice that has a slice coexistence relationship with the first network slice; determining, based on the slice coexistence relationship information, a deployment mode of a network function entity required by the first network slice; and deploying the network function entity in the deployment mode.

The apparatus and the method are based on the same inventive concept, and for a problem-resolving principle and beneficial effects of the apparatus, refer to the method in the first aspect and beneficial effects brought thereof. Therefore, for implementation of the apparatus, refer to the implementation of the method. Repeated content is not described again.

According to a third aspect of the embodiments, a computer-readable storage medium is provided. The computer-readable storage medium stores an instruction, and when the instruction is run on a computer, the computer is enabled to perform the method according to the first aspect.

According to a fourth aspect of the embodiments, a computer program product including an instruction is provided. When the computer program product runs on a computer, the computer is enabled to perform the method according to the first aspect.

BRIEF DESCRIPTION OF DRAWINGS

To describe the technical solutions in the embodiments or in the background more clearly, the following briefly describes the accompanying drawings required for describing the embodiments or the background.

DESCRIPTION OF EMBODIMENTS

Figure 1A:
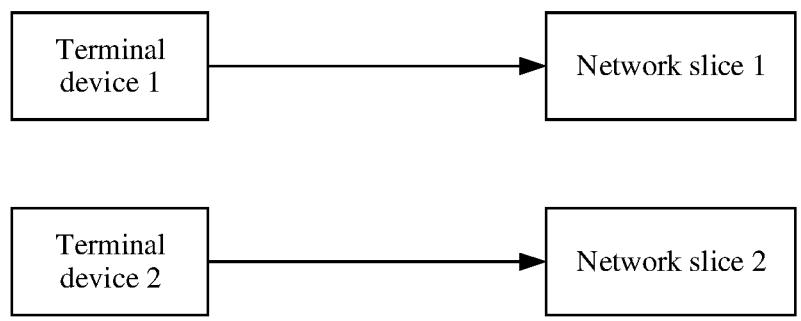
FIG. 1a is an example diagram of a manner in which a terminal device accesses a network slice.
Figure 1B:
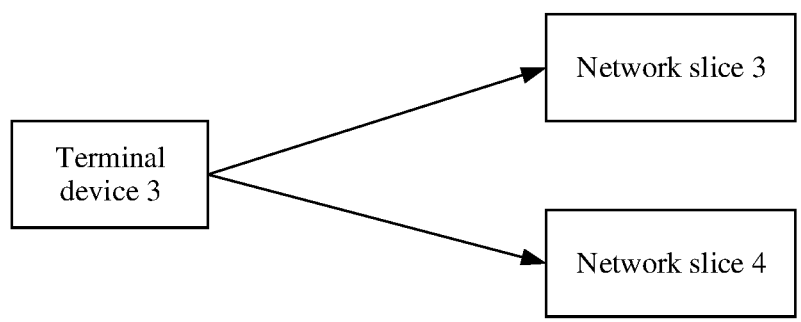
FIG. 1b is an example diagram of another manner in which a terminal device accesses network slices.

In 5G, diversified services have different requirements on a network in terms of a speed, performance, security, reliability, latency, and the like. For example, an eMBB scenario (such as a virtual reality scenario or an augmented reality scenario) has a relatively high requirement on a bandwidth, and requires an x-Gbps bandwidth. In another example, in an mMTC scenario (for example, a wearable scenario or a smart grid scenario), access to massive numbers of devices, for example, hundreds of millions or billions of devices, needs to be supported. In still another example, in a URLLC scenario (for example, an automated driving scenario, a remote surgery scenario, or an industrial control scenario), an ultra-low latency of 1 ms needs to be supported. Network slicing emerges to meet different scenarios and different requirements such as a superior experience requirement by flexibly constructing a network with different features based on the 5G scenarios and the requirements.

In a network slicing technology, a network is logically abstracted as one or more mutually isolated network slices, where each network slice includes a series of logical network functions, to pertinently meet differentiated requirements of different service types.

In the network slicing technology, physical infrastructure resources in a 5G network are abstracted as a plurality of parallel mutually-independent network slice instances based on a scenario requirement. For each network slice instance, network functions are customized, tailored, and orchestrated based on a service model and a requirement of a service scenario. One network slice instance may be considered as one instantiated 5G network. Such a network structure enables an operator to provide a network for a user as a service, and can freely combine entity networks based on indicators such as a rate, a capacity, coverage, a delay, reliability, security, and availability, to meet requirements of different users.

Different network slices may provide different network functions. For example, in a scenario of communication by using a mobile intelligent terminal (for example, a mobile phone), an independent network slice may be used. In another example, in an internet of vehicles scenario, an automatic driving service requires an ultra-low latency, and requires a low processing latency and high reliability in a network. Therefore, an independent network slice may also be used. In still another example, in an mMTC scenario, packets sent by a large quantity of access devices are relatively small, and a requirement on a network latency is relatively low. Therefore, an independent network slice may also be used. Because different network slices need to provide different functions and service of quality requirements, different network functions may be deployed in different network slices. In view of this, slice types of network slices may include an eMBB network slice, an mMTC network slice, and a URLLC network slice.

Terms or names used in the embodiments are described below.

A network slice is a logically isolated network that is deployed on a physical or virtual infrastructure and that is used to support a specific network capability and network feature, may include an entire end-to-end network including an access network, a transport network, a core network, and an application server, and is a key technology that meets differentiated network requirements of 5G mobile communications technologies proposed by the 3rd generation partnership project. Usually, network features of different network slices are different, and the network slices need to be isolated from each other and cause no impact to each other. For example, a network slice of an augmented reality service or a virtual reality) service requires a high bandwidth and a low latency. A network slice of an internet of things (IOT) service requires support for access of massive terminals, but requires a low bandwidth and has no requirement on a latency. The network slice may alternatively be any combination of a terminal device, the access network, the transport network, the core network, and the application server.

A network slice instance is a real operating logical network, and can meet a specific network feature or service requirement. One network slice instance may provide one or more network services. The network slice instance may be created by a network slice management system. One network slice management system may create and indiscriminately manage a plurality of network slice instances. The network slice instance may be created based on a network slice template (NST).

The NST is used to create a network slice instance.

A complete network slice instance can provide a complete end-to-end network service, and the network slice instance may include an NSSI and/or a network function. The NSSI may not provide a complete end-to-end complete network service. The NSSI may be a set of network functions of the same equipment vendor in the network slice instance, or may be a set of network functions, for example, a core-network NSSI and an access-network NSSI, that are grouped based on domains. The NSSI may be shared by a plurality of network slice instances. One network slice instance may include several NSSI, and each NSSI includes several network functions and/or other NSSI. One network slice instance may directly include several NSSI and network functions that are not grouped into NSSI. One network slice instance may alternatively include only several network functions.

A network slice subnet template (NSST) is used to create a NSSI.

A network function has clearly-defined external interfaces and clearly-defined functional behavior. For example, in a 5G network, network functions may include a session management function (SMF), a policy control function (PCF), a user plane function (UPF), a function related to an evolved NodeB (eNB) or a 5G base station (new radio nodeB, or gNB), an AMF, and a network repository function (NRF). The SMF is configured to provide a session management service, the PCF is configured to provide a policy control service, the UPF is configured to provide a user plane service, the AMF is configured to provide an access and mobility management service, the eNB or the gNB (the eNB is used as an example for description below) is configured to provide a radio access service, and the NRF is configured to provide service discovery. The network function may be implemented by using special-purpose hardware, or may be implemented by running software on special-purpose hardware, or may be implemented in a form of a virtual function on a general-purpose hardware platform. Therefore, from a perspective of implementation, network functions may be classified into a physical network function (PNF) and a virtualized network function (VNF). From a perspective of use, network functions may be classified into a dedicated network function and a shared network function. For example, a plurality of (sub) network slice instances may independently use different network functions, and these functions are referred to as dedicated network functions; or may share the same network function, and this function is referred to as a shared network function. The PNF and/or the VNF are/is collectively referred to as a network function below.

A network function entity is a network function instance, is obtained through instantiation, can provide a network service, and has a functional behavior and interface. For example, a network function entity corresponding to the AMF is an AMF instance. In the embodiments, the network function entity is interchangeable with the network function instance.

For ease of description, if a plurality of network slices need to share a network function entity (for example, an AMF instance), the plurality of network slices are referred to as "coexistence slices"; if a plurality of network slices do not share a network function entity, the plurality of network slices are referred to as "exclusive slices". For example, if a network slice 1 and a network slice 2 need to share the AMF, the network slice 1 and the network slice 2 are referred to as "coexistence slices". If a network slice 1 and a network slice 2 do not share the AMF, the network slice 1 and the network slice 2 are referred to as "exclusive slices". It should be noted that, in the embodiments, a plurality of network slices that need to share a network function entity are described as coexistence slices. This does not constitute a limitation on the embodiments. Other terms used to describe the essence of a coexistence slice shall fall within the protection scope.

A mobility management network element is configured to provide an access and mobility management service, and may be an AMF entity in a 5G network, may be a mobility management entity (MME) in a 4G network, or may be a mobility management network element in a future communications network. In the embodiments, the AMF entity is used as an example for description.

Slice coexistence relationship information is slice coexistence relationship information of a network slice, and is used to indicate information about another network slice that has a slice coexistence relationship with the network slice. The information may include a slice type of the other network slice. Alternatively, the information may include a network slice instance identifier and a slice type of the other network slice. It should be noted that the term "slice coexistence relationship information" does not constitute a limitation on the embodiments, and other terms used to describe the essence of slice coexistence relationship information shall fall within the protection scope.

A deployment mode may be a creation mode or a sharing mode, where the creation mode indicates that an instance is instantiated, and the sharing mode indicates that an existing instance in a system or a network is used.

Figure 2:
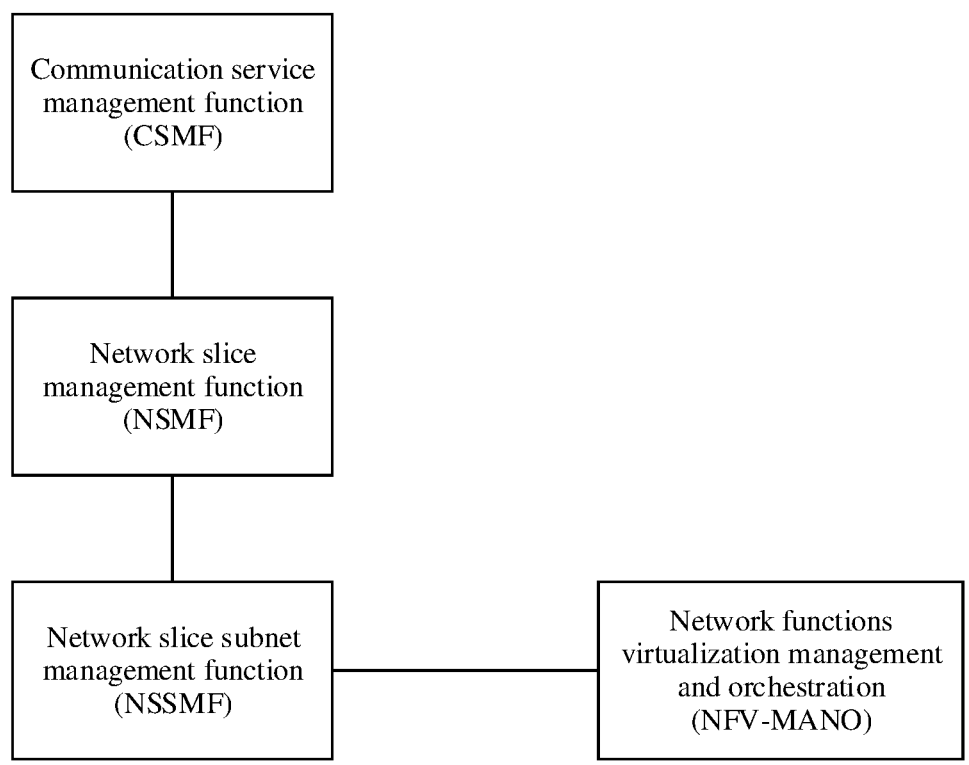
FIG. 2 is a schematic diagram of a network architecture to which an embodiment is applied.

FIG. 2 is a schematic diagram of a network architecture to which an embodiment is applied. The network architecture includes a CSMF, an NSMF, an NSSMF, and a network functions virtualization management and orchestration (NFV-MANO). It should be noted that quantities of CSMFs, NSMFs, NSSMFs, and NFV-MANOs included in the network architecture are not limited to those shown in FIG. 2. In actual application, a plurality of CSMFs, a plurality of NSMFs, a plurality of NSSMFs, and a plurality of NFV-MANOs may be included. It should be noted that the foregoing three management functions may be described by using other names. This is not limited in this embodiment. For example, the CSMF may be referred to as a CSMF entity, and the NSMF may be referred to as an NSMF entity. According to the solutions provided in the embodiments, an operator can provide a network slice instance for a user, to provide a specific communication service, for example, a high-definition video, for the user.

For example, the user may determine corresponding communication service requirements with the operator through negotiation, for example, a coverage area of a network service, a user quantity and user distribution, a mobility requirement, a latency requirement, and information about whether a network slice needs to be isolated from another network slice.

The CSMF is mainly responsible for: converting the communication service requirement of the operator and/or a third-party customer into network slice requirement information, where the network slice requirement information includes a network slice type/slice template identifier ID and network slice deployment requirement information (for example, a network capacity and a quality of service requirement); sending the network slice requirement information to the NSMF through an interface between the CSMF and the NSMF; obtaining management data (for example, performance data and fault data) of the network slice from the NSMF; generating management data of the communication service running on the network slice instance; receiving subscription requirements of the operator and/or the third-party customer for the management data of the network slice and/or the management data of the communication service, and the like.

The NSMF is mainly responsible for: receiving the network slice requirement information sent by the CSMF; managing a life cycle, performance, a fault, and the like of the network slice instance (lifecycle management, performance management, and fault management are referred to as management below); orchestrating composition of the network slice instance; decomposing the network slice requirement information into NSSI requirement information and/or network function requirement information; and sending a network slice subnet instantiation requirement and the like to the NSSMF. It should be noted that the NSMF is not limited to receiving, as shown in FIG. 2, information from the CSMF, and may further receive information from another entity or device.

The NSSMF is mainly responsible for: receiving a network slice subnet requirement sent by the NSMF; managing the NSSI; orchestrating composition of the NSSI; and decomposing the network slice subnet instantiation requirement into network function requirements and/or nested network slice subnet instantiation requirements. In addition, the NSSMF may send a nested network slice subnet instantiation requirement to another NSSMF, may manage a nested NSSI, and the like.

It should be noted that the network function management entity, network function management, and the NSMF are interchangeable in the embodiments. The three terms are all used to describe an entity responsible for receiving the network slice requirement sent by the CSMF, and do not constitute a limitation on the embodiments. This is also applicable to for the NSSMF and the CSMF.

The NFV-MANO is mainly configured to manage and orchestrate a VNF. The NFV-MANO is responsible for: mapping a service network to and associating the service network with a network functions virtualization infrastructure (NFVI) resource, implementing an operations support system service resource procedure, and the like. The NFV-MANO includes function modules such as a network functions virtualization orchestrator (NFVO), a virtualized network function manager (VNFM), and a virtualized infrastructure manager (VIM). Reference may be made to a schematic diagram of a basic structure of the NFV-MANO shown in FIG. 3. In the embodiments, for ease of description, a MANO is used to replace an NFV-MANO.

The NFVO is mainly configured to manage lifecycle (for example, deployment/scale-out/scale-in/termination) of a network service, and implements functions such as NFVI resource orchestration and policy management. The NFVO may obtain, through decomposition, a requirement for each VNF based on a network service descriptor (NSD), and cooperate with the VNFM to deploy VNFs. The NSD is used to describe a network topology and required resource information for instantiating the network service.

The VNFM is mainly configured to: manage lifecycle of the VNF, for example, automatic capabilities such as deployment, scale-out, scale-in, and termination; obtain, through decomposition, a requirement for a virtual resource such as a virtual machine based on a VNFD template and a VNF capacity requirement; and cooperate with the NFVO and the VIM to instantiate the VNF.

The VIM manages and monitors infrastructure resources (including a computing resource, a storage resource, and a network resource.

Figure 3:
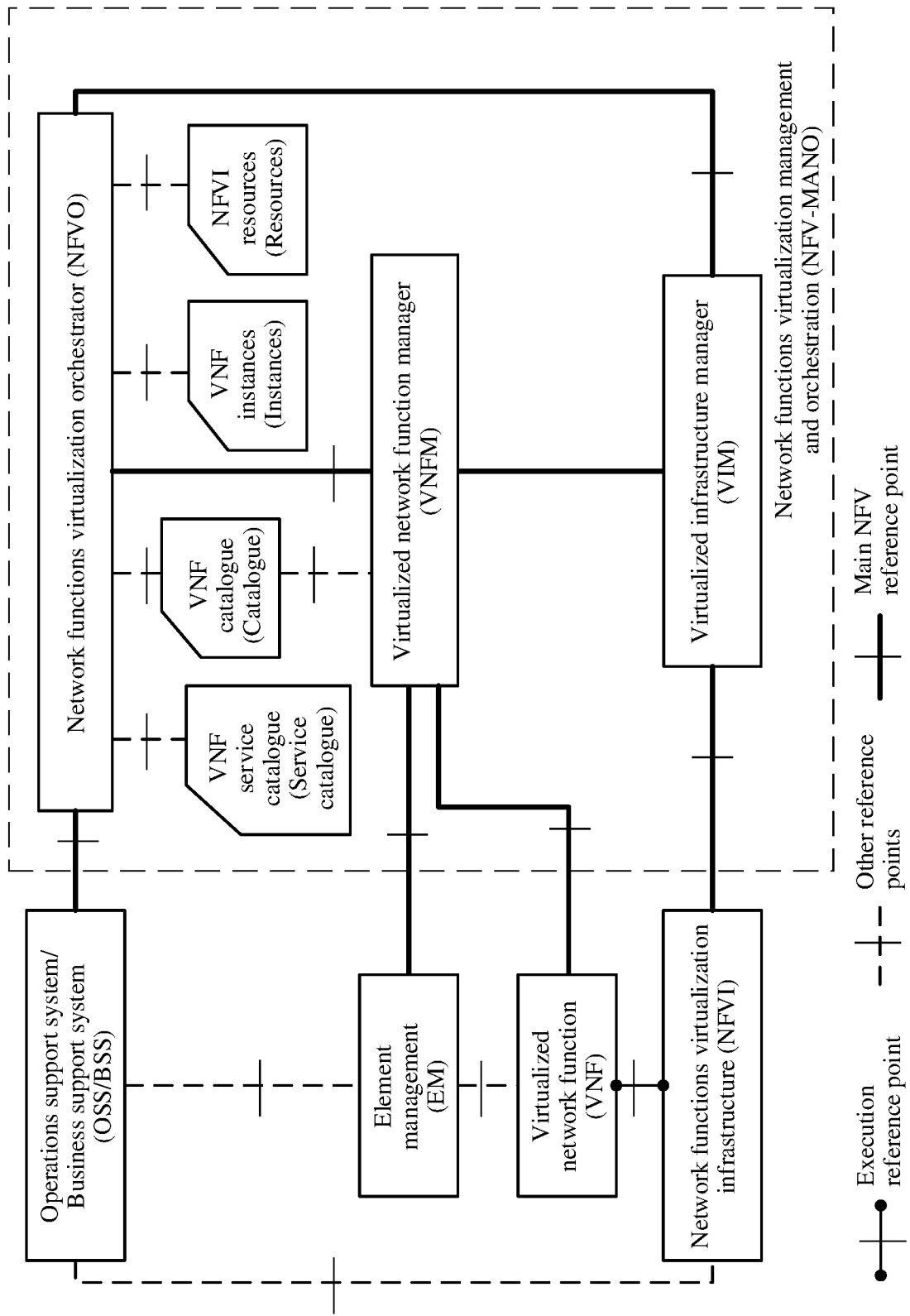
FIG. 3 is a schematic diagram of a basic architecture of network functions virtualization management and orchestration shown in FIG. 2.

The NFVI in FIG. 3 is a resource pool from a perspective of cloud computing. When the NFVI is mapped to a physical infrastructure, the NFVI is equivalent to a plurality of geographically dispersed data centers that are connected through a high-speed communications network. The NFVI needs to convert a physical computing resource/storage resource/switching resource to a virtual computing resource/storage resource/switching resource through virtualization.

To deploy a network slice and a network slice subnet through instantiation, the NFV-MANO needs to instantiate a network service. The instantiation of the network service requires application to the NFVI for virtual resources required for instantiation of the network slice or the network slice subnet.

On the basis of the network architecture shown in FIG. 2, embodiments provide a network slice deployment method and apparatus, which are applicable to a scenario in which one terminal device simultaneously accesses a plurality of network slices. In this way, network functional entities required by the plurality of network slices can be conveniently and clearly deployed, thereby improving network slice management efficiency.

Figure 4:
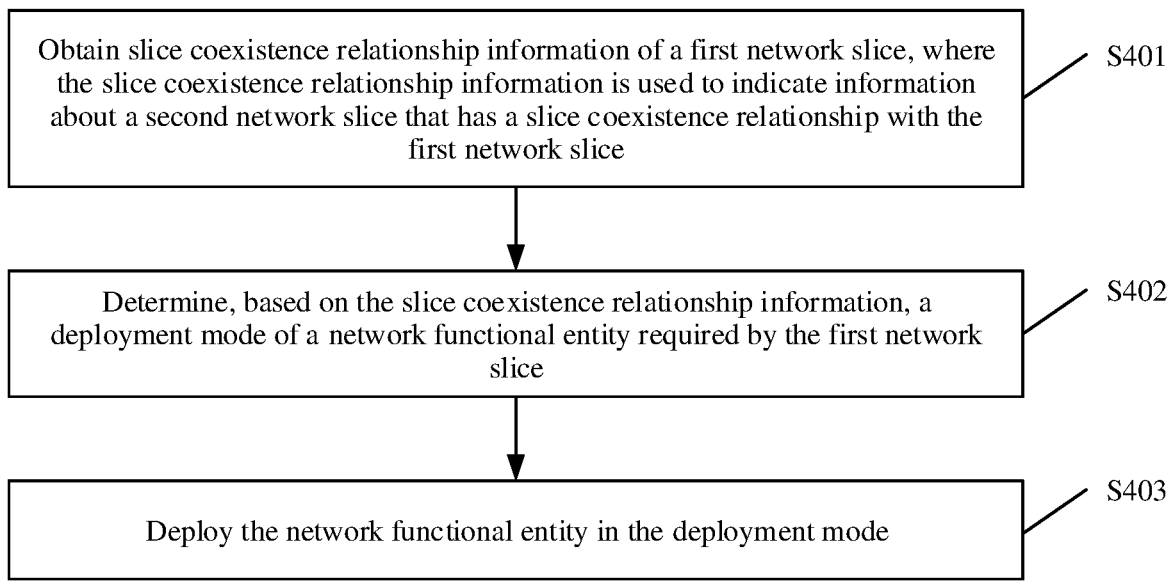
FIG. 4 is a schematic flowchart of a network slice deployment method according to an embodiment.

FIG. 4 is a schematic flowchart of a network slice deployment method according to an embodiment. The method may include but is not limited to the following steps.

In step S401, obtain slice coexistence relationship information of a first network slice, where the slice coexistence relationship information is used to indicate information about a second network slice that has a slice coexistence relationship with the first network slice.

A network slice deployment apparatus obtains the slice coexistence relationship information of the first network slice. The network slice deployment apparatus may be an NSMF, or may be an NSSMF. If the network slice deployment apparatus is the NSMF, the NSMF receives the slice coexistence relationship information of the first network slice from a CSMF; or if the network slice deployment apparatus is the NSSMF, the NSSMF receives the slice coexistence relationship information of the first network slice from an NSMF.

The first network slice is a to-be-instantiated network slice.

In a possible implementation, the slice coexistence relationship information includes a coexistence network slice type list that is used to indicate a slice type of the second network slice that has a slice coexistence relationship with the first network slice. In other words, the coexistence network slice type list includes the slice type of the second network slice. It may be understood that the first network slice and the second network slice need to access the same AMF. In other words, the AMF is an AMF shared by the first network slice and the second network slice. There may be one, two, or more second network slices.

For example, if a slice type of the first network slice is A, and there are two second network slices and slice types of the two second network slices are B and C, the coexistence network slice type list may be expressed as Co-existenceSlicetypelists=(A, B, C) or Co-existenceSlicetypelists=(B, C). The coexistence network slice type list may further include a tenant identifier. For example, if a tenant identifier corresponding to the first network slice is 1, and tenant identifiers corresponding to the two second network slices are 2 and 3, the coexistence network slice type list may be expressed as Co-existenceSlicetypelists=((Tenant ID 1, A), (tenant ID 2, B), (tenant ID 3, C)) or Co-existenceSlicetypelists=((tenant ID 2, B), (tenant ID 3, C)). It may be understood that, when the coexistence network slice type list does not include the tenant identifier, for example, Co-existenceSlicetypelists=(A, B, C) or Co-existenceSlicetypelists=(B, C), it indicates that a determination related to the coexistence slice is performed for the same tenant, and a network slice used by the tenant does not have a slice coexistence relationship with a network slice used by another tenant.

In a possible implementation, the slice coexistence relationship information includes the coexistence network slice type list and a coexistence network slice instance list that are used to indicate the slice type of the second network slice that has a slice coexistence relationship with the first network slice and indicate a network slice instance corresponding to the existing second network slice. The coexistence network slice type list is the same as the coexistence network slice type list in the foregoing implementation.

The coexistence network slice instance list includes a network slice instance identifier that corresponds to the existing second network slice and that is used to indicate the network slice instance corresponding to the existing second network slice. One network slice instance identifier is used to identify one network slice instance. For example, the coexistence network slice instance list may be expressed as Co-existenceNSI lists={NSI ID}. If the first network slice is the first network slice in a plurality of to-be-instantiated coexistence slices, the coexistence network slice instance list is empty and may be expressed as Co-existenceNSI lists={NSI ID}=NULL. If the first network slice is not the first network slice in a plurality of to-be-instantiated coexistent slices, that is, the first network slice is the second network slice, the third network slice, or a next network slice of the third network slice, the coexistence network slice instance list is not empty, and includes a network slice instance identifier corresponding to an instantiated second network slice. For example, the coexistence network slice instance list includes a network slice instance identifier B, and may be expressed as Co-existenceNSI lists={NSI B} or Co-existenceNSI lists={NSI-B ID}.

The network slice deployment apparatus may further receive a network slice isolation flag of the first network slice, and the network slice isolation flag may be sent with the slice coexistence relationship information. The network slice isolation flag may be expressed as Sliceisolationflag or another name, and is used to indicate that a network function instance, other than a mobility management network element, included in a first network slice instance needs to be created. If the network function instance, other than the mobility management network element, included in the first network slice instance needs to be created, the network slice isolation flag may be expressed as Sliceisolationflag=1 or Sliceisolationflag=yes. If the network function instance, other than the mobility management network element, included in the first network slice instance does not need to be created, the network slice isolation flag may be expressed as Sliceisolationflag=0 or Sliceisolationflag=no, indicating that the network function instance, other than the mobility management network element, included in the first network slice instance may be shared.

In step S402, determine, based on the slice coexistence relationship information, a deployment mode of a network function entity required by the first network slice.

When the slice coexistence relationship information includes the coexistence network slice type list, the network slice deployment apparatus determines, based on the coexistence network slice type list, whether a network slice instance corresponding to the slice type of the second network slice exists, and, for example, determines whether a network slice instance corresponding to the slice type of the second network slice exists in a system. For example, if the slice type of the second network slice is B, the network slice deployment apparatus determines whether a network slice instance corresponding to the slice type B exists in the system. When the network slice instance corresponding to the slice type of the second network slice exists, the network slice deployment apparatus determines that the deployment mode of an AMF instance required by the first network slice is a sharing mode. When the network slice instance corresponding to the slice type of the second network slice does not exist, the network slice deployment apparatus determines that the deployment mode of an AMF instance required by the first network slice is a creation mode.

It should be noted that, when the coexistence network slice type list includes slice types of a plurality of second network slices, the network slice deployment apparatus may determine that the deployment mode of the AMF instance required by the first network slice is a sharing mode provided that a network slice instance corresponding to the slice type of one of the second network slices exists.

When the coexistence network slice type list further includes the tenant identifier of the second network slice, the network slice deployment apparatus determines whether a network slice instance corresponding to the slice type and the tenant identifier of the second network slice exists. When the network slice instance corresponding to the slice type and the tenant identifier of the second network slice exists, the network slice deployment apparatus determines that the deployment mode of the AMF instance required by the first network slice is a sharing mode. When the network slice instance corresponding to the slice type and the tenant identifier of the second network slice does not exist, the network slice deployment apparatus determines that the deployment mode of the AMF instance required by the first network slice is a creation mode.

When the slice coexistence relationship information includes the coexistence network slice type list and the coexistence network slice instance list, there are three cases, as described in the following, in which the network slice deployment apparatus determines the deployment mode of the AMF instance required by the first network slice.

Case 1: The coexistence network slice instance list is empty, and the network slice deployment apparatus determines, based on the coexistence network slice type list, whether a coexistence network slice instance exists, and, for example, determines, through search, whether a coexistence network slice instance exists in a system. It may be understood that an AMF instance of the coexistence network slice instance may be shared by the first network slice. When the coexistence network slice instance exists, the network slice deployment apparatus determines that the deployment mode of the AMF instance required by the first network slice is a sharing mode; or when the coexistence network slice instance does not exist, the network slice deployment apparatus determines that the deployment mode of the AMF instance required by the first network slice is a creation mode.

It should be noted that there is one coexistence network slice instance by default. When there are two or more coexistence network slice instances, the network slice deployment apparatus needs to determine whether these coexistence network slice instances share an AMF instance. When these coexistence network slice instances share an AMF instance, the network slice deployment apparatus determines that the deployment mode of the AMF instance required by the first network slice is a sharing mode.

Case 2: The coexistence network slice instance list includes at least two network slice instance identifiers that are used to identify at least two network slice instances. The network slice deployment apparatus determines whether the at least two network slice instances share an AMF instance, and, for example, determines whether AMF instances of the at least two network slice instances are the same AMF instance. When the at least two network slice instances share an AMF instance, the network slice deployment apparatus determines whether the AMF instance shared by the at least two network slice instances supports the slice type of the first network slice. When the AMF instance shared by the at least two network slice instances supports the slice type of the first network slice, the network slice deployment apparatus determines that the deployment mode of the AMF instance required by the first network slice is a sharing mode.

Case 3: The coexistence network slice instance list includes one network slice instance identifier that is used to identify one network slice instance. The network slice deployment apparatus determines whether an AMF instance of the one network slice instance supports the slice type of the first network slice, and when the AMF instance of the one network slice instance supports the slice type of the first network slice, the network slice deployment apparatus determines that the deployment mode of the AMF instance required by the first network slice is a sharing mode.

For the foregoing case 2 and case 3, when the AMF instance does not support the slice type of the first network slice, for example, when the AMF instance shared by the at least two network slice instances does not support the slice type of the first network slice, or when the AMF instance of the one network slice instance does not support the slice type of the first network slice, the network slice deployment apparatus sends a failure message that carries a failure cause. If the network slice deployment apparatus is the NSMF, the failure message is sent to the CSMF; if the network slice deployment apparatus is the NSSMF, the failure message is sent to the NSMF, and the NSMF sends the failure message to the CSMF.

In step S403, deploy the network function entity in the deployment mode.

If the network slice deployment apparatus determines that the deployment mode of the AMF instance required by the first network slice is a creation mode, the network slice deployment apparatus instantiates the AMF. If the network slice deployment apparatus further receives the network slice isolation flag of the first network slice, the network slice deployment apparatus also instantiates another network function that is included in the first network slice.

If the network slice deployment apparatus determines that the deployment mode of the AMF instance required by the first network slice is a sharing mode, the network slice deployment apparatus uses an existing AMF instance, where the existing AMF instance may be the AMF instance shared by the at least two network slice instances, the AMF instance of the one network slice instance, or the AMF instance of the coexistence network slice instance. If the network slice deployment apparatus further receives the network slice isolation flag of the first network slice, the network slice deployment apparatus instantiates another network function that is included in the first network slice. It may be understood that the network slice deployment apparatus deploys, by using the existing AMF instance, the AMF instance required by the first network slice, and therefore creation of a new AMF instance is not required.

In the embodiment shown in FIG. 4, the network slice deployment apparatus obtains the slice coexistence relationship information of the first network slice, determines, based on the slice coexistence relationship information, the deployment mode of the AMF instance required by the first network slice, and deploys, in the determined deployment mode, the AMF instance required by the first network slice.

The following describes, with reference to FIG. 5 to FIG. 8B, an interaction procedure of a network slice deployment method according to the embodiments.

Figure 5:
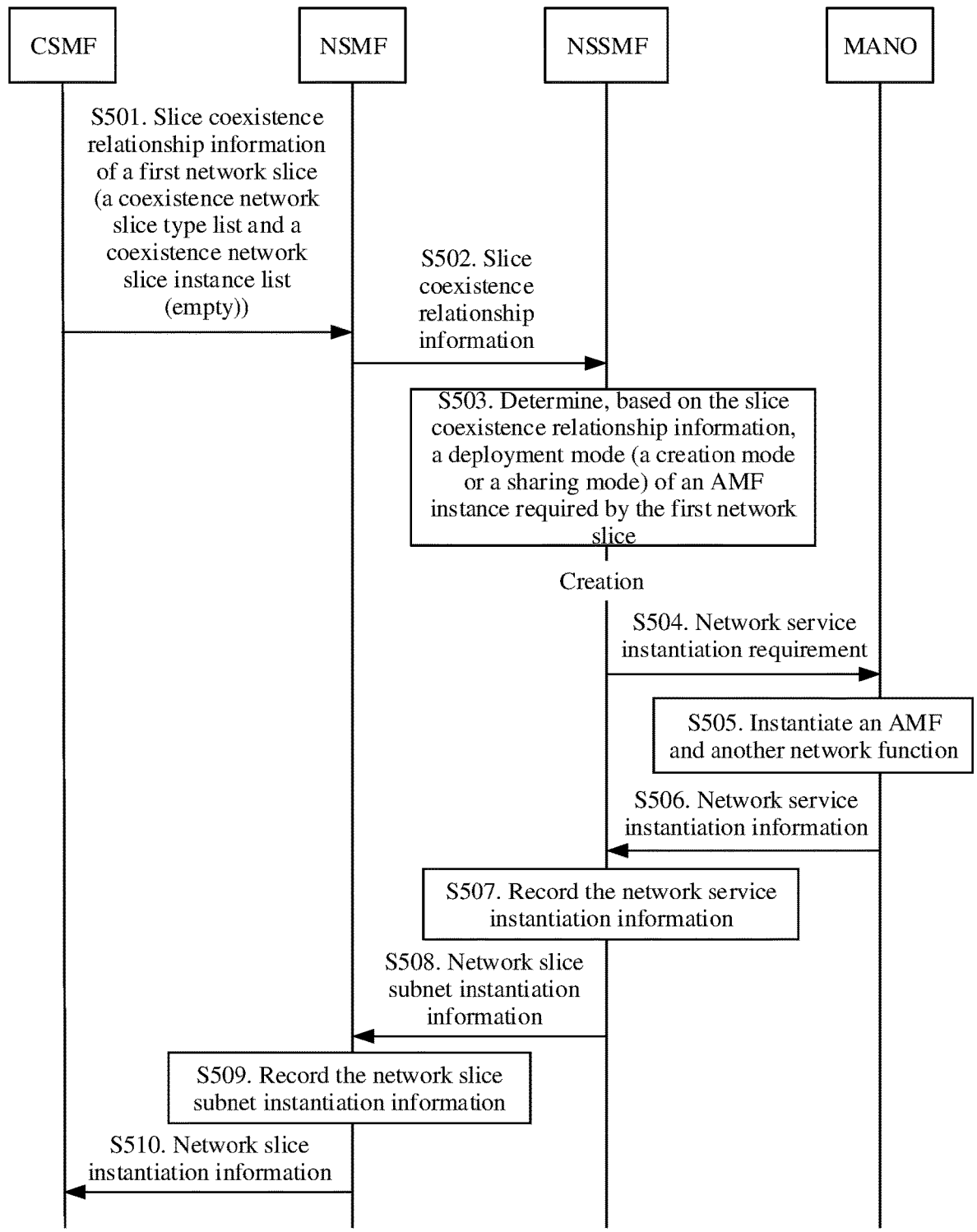
FIG. 5 is a schematic interaction flowchart 1 of a network slice deployment method according to an embodiment.

FIG. 5 is a schematic interaction flowchart 1 of a network slice deployment method according to an embodiment. The method may include but is not limited to the following steps.

In step S501, a CSMF sends slice coexistence relationship information of a first network slice to an NSMF, where the slice coexistence relationship information includes a coexistence network slice type list and a coexistence network slice instance list (empty). Correspondingly, the NSMF receives the slice coexistence relationship information from the CSMF.

In the embodiment shown in FIG. 5, if the first network slice is the first network slice in a plurality of to-be-instantiated coexistence slices, the coexistence network slice instance list is empty and may be expressed as Co-existenceNSI lists={NSI ID}=NULL. If a first network slice instance is the second instance, the third instance, or a subsequent instance after the third instance that is in coexistence slice instances and that corresponds to the network slice, the coexistence network slice instance list is not empty.

A tenant/subscriber of a network slice, for example, an operator or a third-party customer, may subscribe to the network slice through an operation interface of a business support system (BSS), that is, enter a service requirement on the operation interface of the BSS. The service requirement may include a service type, and may further include a service-level agreement (SLA) requirement. An SLA is a contract between a network service provider and the customer, and the SLA requirement may include a user quantity requirement, a bandwidth requirement, a latency assurance requirement, and the like. It may be understood that the service requirement includes the service type and the SLA requirement.

When receiving the service requirement, the CSMF (or the BSS) converts the service requirement, where the conversion specifically includes service type conversion and SLA requirement conversion. The service type conversion is to convert the service type in the service requirement into a network slice type, for example, an eMBB network slice, a URLLC network slice, or an mMTC network slice. Optionally, in an exemplary case, the CSMF may further search, based on the network slice type, for a network slice template identifier (NST ID) corresponding to the network slice type. The SLA requirement conversion is to convert the SLA requirement into network slice requirement information, and the network slice requirement information may include the user quantity requirement, the bandwidth requirement, the latency requirement, and the like. In other words, the network slice requirement information is used to describe requirement information such as the user quantity, a bandwidth, and a latency that are required for the network slice.

After the service requirement is converted, the CSMF sends a slice type of the first network slice and the network slice requirement information to the NSMF.

In a possible implementation, the network slice requirement information further includes the slice coexistence relationship information of the first network slice. In other words, the slice coexistence relationship information of the first network slice is sent to the NSMF through the network slice requirement information.

The slice type of the first network slice may be one of the eMBB network slice, the URLLC network slice, and the mMTC network slice, or may be another type of network slice. For example, if the slice type of the first network slice is A, the slice type of the first network slice may be expressed as slicetype=A or expressed by a name of the slice type. If a network slice instantiation requirement does not carry the slice type of the first network slice, an NST ID corresponding to the slice type of the first network slice may be carried, and is used to indicate the slice type of the first network slice.

In a possible implementation, the CSMF further sends a tenant identifier of the first network slice to the NSMF, where the tenant identifier is used to identify a subscriber of the first network slice. When the coexistence network slice type list does not include the tenant identifier of the first network slice, the CSMF may send the tenant identifier of the first network slice to the NSMF. When the coexistence network slice type includes the tenant identifier of the first network slice, the CSMF may not need to send the tenant identifier of the first network slice to the NSMF.

In a possible implementation, the CSMF further sends a network slice isolation flag of the first network slice to the NSMF, where the network slice isolation flag may be expressed as Sliceisolationflag=yes, and is used to indicate that a network function instance, other than an AMF instance, included in the first network slice instance needs to be created.

With reference to the foregoing several implementations, an example in which the first network slice of the slice type A, a second network slice of a slice type B, and a second network slice of a slice type C have a slice coexistence relationship is used. Information sent by the CSMF to the NSMF may include the slice type (slicetype=A) of the first network slice, the coexistence network slice type list (Co-existenceSlicetypelists=((Tenant ID 1, A), (tenant ID 2, B), (tenant ID 3, C))), the coexistence network slice instance list (Co-existenceNSI lists={NSI ID}, the tenant identifier (Tenant ID 1) of the first network slice, the network slice requirement information, and the network slice isolation flag (Sliceisolationflag).

In step S502, the NSMF sends the slice coexistence relationship information of the first network slice to an NSSMF, where the slice coexistence relationship information includes the coexistence network slice type list and the coexistence network slice instance list (empty). Correspondingly, the NSSMF receives the slice coexistence relationship information from the NSMF.

Before sending the slice coexistence relationship information of the first network slice to the NSSMF, the NSMF generates an identifier of the first network slice instance corresponding to the first network slice, and decomposes the network slice requirement information into network slice subnet requirement information.

One network slice instance may include a plurality of NSSI. In this case, the NSMF may decompose the network slice requirement information into a plurality of pieces of network slice subnet requirement information. A quantity of the plurality of pieces of network slice subnet requirement information is equal to a quantity of the plurality of NSSI. In other words, the NSMF pertinently decomposes the network slice requirement information. The network slice subnet requirement information is used to describe requirement information such as a user quantity, a bandwidth, and a latency that are required for a corresponding network slice subnet.

After decomposing the network slice requirement information, the NSMF separately sends a network slice subnet instantiation requirement to a plurality of NSSMFs. The network slice subnet instantiation requirement includes the slice coexistence relationship information of the first network slice, where the slice coexistence relationship information is the slice coexistence relationship information in step S501.

In a possible implementation, the NSMF further sends the slice type of the first network slice and the network slice subnet requirement information to the NSSMF.

The slice type of the first network slice may be one of the eMBB network slice, the URLLC network slice, and the mMTC network slice, or may be another type of network slice. For example, if the slice type of the first network slice is A, the slice type of the first network slice may be expressed as slicetype=A. If a network slice subnet instantiation requirement does not carry the slice type of the first network slice, a network slice subnet template identifier corresponding to the slice type of the first network slice may be carried, and is used to indicate the slice type of the first network slice.

In a possible implementation, the NSMF further sends the tenant identifier of the first network slice, the network slice isolation flag, and the identifier of the first network slice instance to the NSSMF.

For example, information sent by the NSMF to the NSSMF may include slicetype=A, Co-existenceSlicetypelists=((Tenant ID 1, A),(tenant ID 2, B),(tenant ID 3, C)), Co-existenceNSI lists={NSI ID}, Tenant ID 1, the network slice instance identifier (NSI ID), the network slice subnet requirement information, and the network slice isolation flag (Sliceisolationflag).

In step S503, the NSSMF determines, based on the slice coexistence relationship information, a deployment mode (a creation mode or a sharing mode) of an AMF instance required by the first network slice.

The NSSMF may allocate a network slice subnet instance identifier (NSSI ID), and determine, based on the slice coexistence relationship information, the deployment mode of the AMF instance required by the first network slice.

The NSSMF determines whether the coexistence network slice instance list is empty. If the coexistence network slice instance list is empty, the NSSMF determines, through search and based on the coexistence network slice type list, whether a coexistence network slice instance exists in a system. A case in which the coexistence network slice instance list is not empty is described in the embodiment shown in FIG. 6A and FIG. 6B. It may be understood that an AMF instance of the coexistence network slice instance may be shared by the first network slice. If the coexistence network slice instance exists in the system, the NSSMF determines that the deployment mode of the AMF instance required by the first network slice is a sharing mode, that is, the AMF instance of the coexistence network slice instance is used. If the coexistence network slice instance does not exist in the system, the NSSMF determines that the deployment mode of the AMF instance required by the first network slice is a creation mode, that is, one AMF instance is instantiated to support both the first network slice and at least one second network slice. According to the foregoing example, one AMF instance is instantiated to support each of the network slice types A, B, and C.

In step S504, if the deployment mode is a creation mode, the NSSMF sends a network service instantiation requirement to a MANO, where the network service instantiation requirement includes a network service descriptor identifier (NSD ID) and a network service instantiation parameter. Correspondingly, the MANO receives the network service instantiation requirement from the NSSMF.

If the NSSMF determines that the deployment mode is a creation mode, the NSSMF may instantiate an AMF based on the network slice subnet requirement information, to obtain an AMF instance. The AMF instance may support both the first network slice and at least one second network slice that has a slice coexistence relationship with the first network slice.

The NSSMF sends the network service instantiation requirement to the MANO, where the network service instantiation requirement includes the NSD ID and the network service instantiation parameter.

Steps S504 to S508 are a process of instantiating the AMF and a network function other than the AMF.

In step S505, the MANO instantiates the AMF and another network function.

When receiving the network service instantiation requirement, the MANO may instantiate the AMF and the other network function based on the NSD ID and the network service instantiation parameter. For example, the MANO performs virtual resource instantiation on the AMF and the other network function. When completing the virtual resource instantiation, the MANO may obtain a network service instance identifier, a plurality of virtualized network function descriptor identifiers (VNFD ID), and virtualized network function instance identifiers (VNF instance ID) corresponding to the VNFD IDs.

A VNFD is used to describe a network topology and required resource information for instantiating a VNF.

In step S506, the MANO sends network service instantiation information to the NSSMF, where the network service instantiation information includes the network service instance identifier, the VNFD IDs, and the VNF instance IDs corresponding to the VNFD IDs. Correspondingly, the NSSMF receives the network service instantiation information from the MANO.

When completing the virtual resource instantiation, the MANO sends the network service instantiation information to the NSSMF. The network service instantiation information is a response to the network service instantiation requirement, and includes the network service instance identifier, the plurality of VNFD IDs, and the VNF instance IDs corresponding to the VNFD IDs.

In step S507, the NSSMF records the network service instantiation information.

The NSSMF records the network service instantiation information, and records all VNF instance IDs included in the NSSI ID, that is, records all the VNF instance IDs included in the NSSI. In this way, a correspondence between the NSSI and each VNF instance included in the NSSI is established.

The NSSMF establishes a network topology between the VNF instances based on VNFDs.

In step S508, the NSSMF sends network slice subnet instantiation information to the NSMF, where the network slice subnet instantiation information includes the identifier of the first network slice instance and the NSSI ID. Correspondingly, the NSMF receives the network slice subnet instantiation information from the NSSMF.

When receiving the network service instantiation information, the NSSMF sends the network slice subnet instantiation information to the NSMF. The network slice subnet instantiation information is a response to the network slice subnet instantiation requirement, and includes the identifier of the first network slice instance and the NSSI ID.

The network slice subnet instantiation information further includes a VNF type and the VNF instance ID. For example, the network slice subnet instantiation information further includes an AMF type and a VNF instance ID of the AMF type.

In step S509, the NSMF records the network slice subnet instantiation information.

When receiving the network slice subnet instantiation information, the NSMF records the network slice subnet instantiation information, that is, records the identifier of the first network slice instance and the NSSI ID corresponding to the first network slice instance. In this way, a correspondence between the first network slice instance and the NSSI corresponding to the first network slice is established. For example, correspondences between the first network slice instance and the plurality of NSSI are established.

The NSMF further records the VNF type and the VNF instance ID that are included in the NSSI, so that the NSMF can search for the AMF instance based on the coexistence relationship information.

In step S510, the NSMF sends network slice instantiation information to the CSMF, where the network slice instantiation information includes the tenant identifier of the first network slice and the identifier of the first network slice instance.

When receiving the network slice subnet instantiation information, the NSMF sends the network slice instantiation information to the CSMF. The network slice instantiation information is a response to the network slice instantiation requirement, and includes the tenant identifier of the first network slice and the identifier of the first network slice instance.

When receiving the network slice instantiation information, the CSMF records the identifier of the first network slice instance.

In the embodiment shown in FIG. 5, a process of deploying the first network slice in the plurality of coexistence network slices is described. In the process, it is determined, based on the slice coexistence relationship information, that the deployment mode of the AMF instance required by the first network slice is a creation mode, so that during subsequent deployment of the coexistence network slice, the AMF instance included in the first network slice instance may be directly used. This helps improve network slice management efficiency.

Figure 6A:
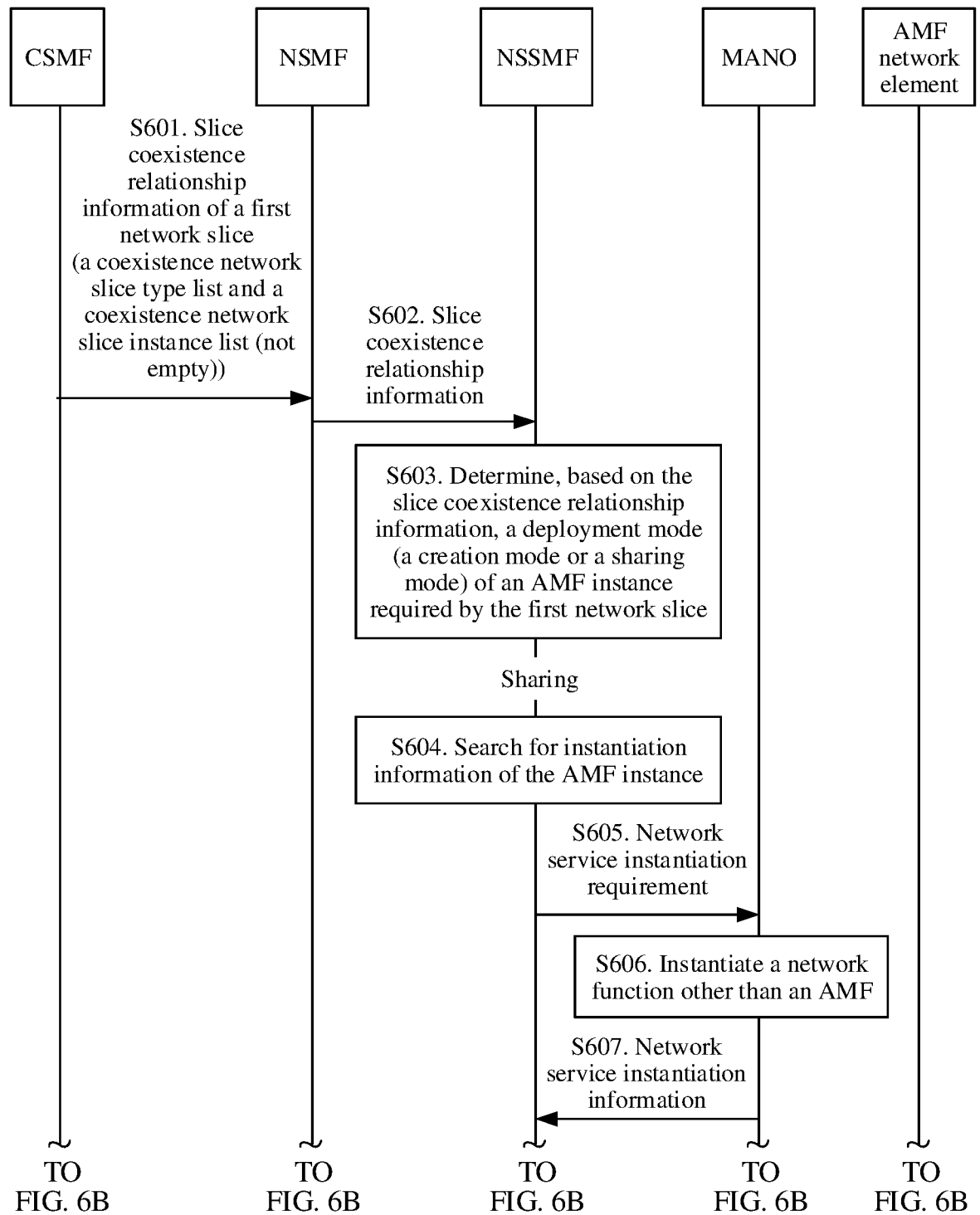
FIG. 6A is a schematic interaction flowchart 2 of a network slice deployment method according to an embodiment.
Figure 6B:
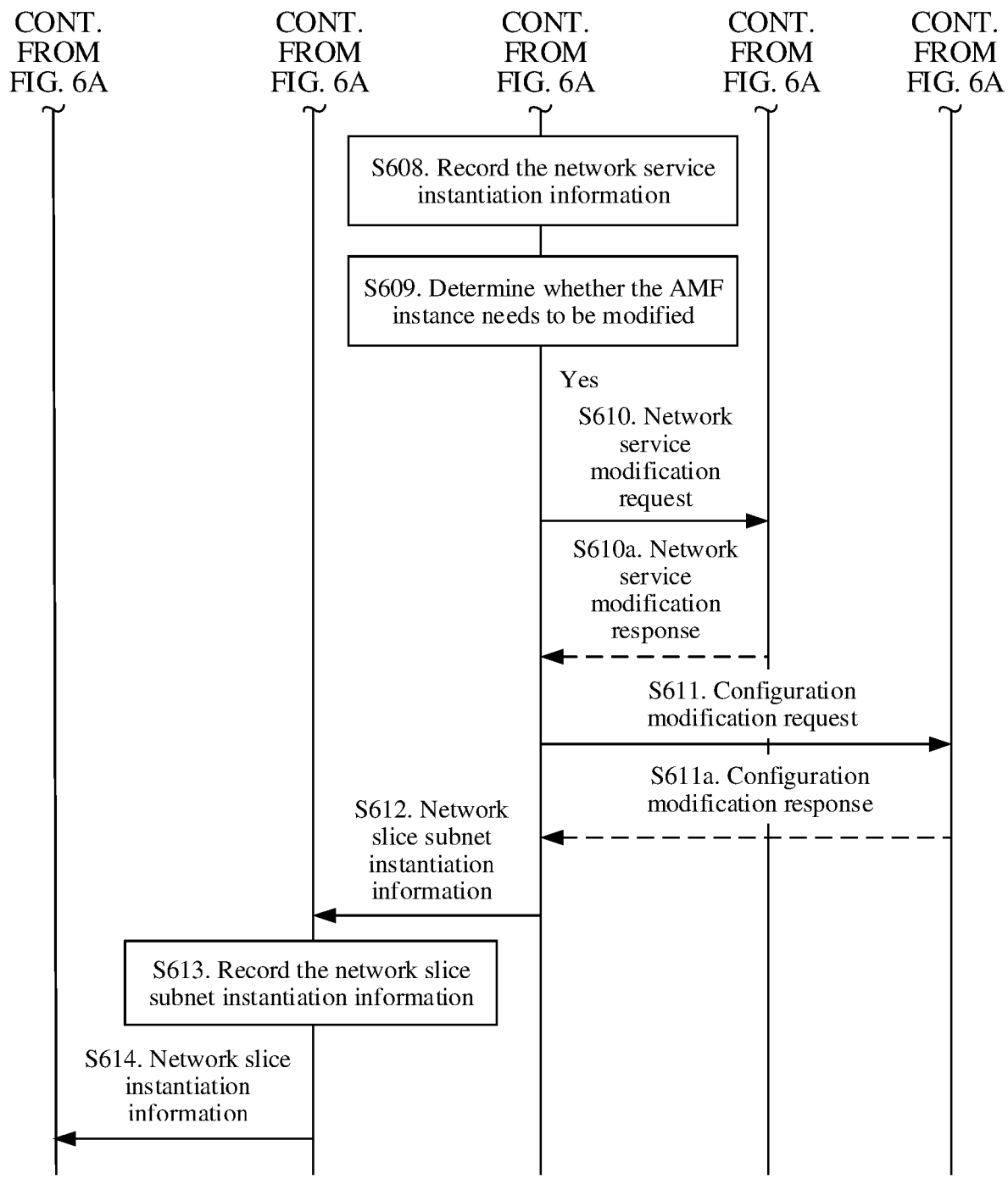
FIG. 6B is a schematic interaction flowchart 2 of a network slice deployment method according to an embodiment.

FIG. 6A and FIG. 6B are a schematic interaction flowchart 2 of a network slice deployment method according to an embodiment. The method may include but is not limited to the following steps.

In step S601, a CSMF sends slice coexistence relationship information of a first network slice to an NSMF, where the slice coexistence relationship information includes a coexistence network slice type list and a coexistence network slice instance list (not empty). Correspondingly, the NSMF receives the slice coexistence relationship information from the CSMF.

A difference between step S601 and step S501 lies in the following: The first network slice in step S501 is the first network slice in the plurality of coexistence network slices, and the coexistence network slice instance list is empty. The first network slice in step S601 is a subsequent network slice after the plurality of coexistence network slices, that is, the first network slice is not the first network slice, and the coexistence network slice instance list is not empty, and includes a network slice instance that corresponds to at least one existing second network slice and that has a slice coexistence relationship with a first network slice instance. In addition, a slice type of the first network slice in step S601 is different from the slice type of the first network slice in step S501.

It may be understood that the coexistence network slice instance list in step S601 includes a network slice instance identifier corresponding to the second network slice that has been deployed in a system. If two network slice instances have been deployed, the coexistence network slice instance list includes identifiers of the two network slice instances. If one network slice instance has been deployed, the coexistence network slice instance list includes an identifier of the network slice instance.

For example, network slices 1, 2, and 3 are in a mutual slice coexistence relationship. If the network slices 1 and 2 have been deployed, that is, a network slice instance 1 and a network slice instance 2 exist, the coexistence network slice instance list includes the network slice instance 1 and the network slice instance 2, and may be expressed as Co-existenceNSI_Lists={NSI ID 1, NSI ID 2}. If the network slice 1 has been deployed, that is, the network slice instance 1 exists, the coexistence network slice instance list includes the network slice instance 1, and may be represented as a Co-existenceNSI_Lists={NSI ID 1}.

In step S602, the NSMF sends the slice coexistence relationship information of the first network slice to an NSSMF, where the slice coexistence relationship information includes the coexistence network slice type list and the coexistence network slice instance list (not empty). Correspondingly, the NSSMF receives the slice coexistence relationship information from the NSMF.

It should be noted that step S601 and step S602 shown in FIG. 6A are different from step S501 and step S502 shown in FIG. 5 in that the coexistence network slice instance list in the embodiment shown in FIG. 6A is not empty. For other same parts, refer to the exemplary descriptions of step S501 and step S502 shown in FIG. 5. Details are not described herein again.

In step S603, the NSSMF determines, based on the slice coexistence relationship information, a deployment mode (a creation mode or a sharing mode) of an AMF instance required by the first network slice.

The NSSMF searches for, based on the coexistence network slice instance list, a network slice instance corresponding to each second network slice. For example, if the coexistence network slice instance list includes a network slice instance identifier 1, the NSSMF searches for the network slice instance 1. In another example, if the coexistence network slice instance list includes the network slice instance identifier 1 and a network slice instance identifier 2, the NSSMF searches for the network slice instance 1 and the network slice instance 2.

Case 1: The coexistence network slice instance list includes at least two network slice instance identifiers, for example, includes the network slice instance identifier 1 and the network slice instance identifier 2.

The NSSMF determines whether the at least two network slice instances share an AMF instance, for example, the NSSMF determines whether an AMF instance of the network slice instance 1 and an AMF instance of the network slice instance 2 are the same. If the AMF instance of the network slice instance 1 and the AMF instance of the network slice instance 2 are the same, it may be determined that the network slice instance 1 and the network slice instance 2 share an AMF instance. If the AMF instance of the network slice instance 1 and the AMF instance of the network slice instance 2 are different, it may be determined that the network slice instance 1 band the network slice instance 2 do not share an AMF instance.

If the at least two network slice instances share an AMF instance, the NSSMF determines whether the AMF instance shared by the at least two network slice instances supports the slice type of the first network slice. For example, if a slice type of the network slice instance 1 is A, a slice type of the network slice instance 2 is B, and the slice type of the first network slice is C, the NSSMF determines whether the AMF instance shared by the network slice instance 1 and the network slice instance 2 supports the slice type C. If the slice type of the first network slice is supported, the NSSMF determines that the deployment mode of the AMF instance required by the first network slice is a sharing mode, that is, the AMF instance shared by the network slice instance 1 and the network slice instance 2 may be directly used. If the at least two network slice instances do not share an AMF instance, the NSSMF determines that the deployment mode of the AMF instance required by the first network slice is a creation mode.

Case 2: The coexistence network slice instance list includes one network slice instance identifier, for example, includes the network slice instance identifier 1.

The NSSMF determines whether an AMF instance of the one network slice instance supports the slice type of the first network slice. For example, if the slice type of the network slice instance 1 is A, and the slice type of the first network slice is B, the NSSMF determines whether the AMF instance of the network slice instance 1 supports the slice type B. If the slice type of the first network slice is supported, the NSSMF determines that the deployment mode of the AMF instance required by the first network slice is a sharing mode, that is, the AMF instance of the network slice instance 1 may be directly used.

In the foregoing two cases, if the AMF instance shared by the at least two network slice instances does not support the slice type of the first network slice, or the AMF instance of the one network slice instance does not support the slice type of the first network slice, the NSSMF sends a failure message to the NSMF, where the failure message includes an identifier of the first network slice instance and a failure cause. When receiving the failure message, the NSMF sends the failure message to the CSMF, so that the CSMF learns the failure cause.

In step S604, if the deployment mode is a sharing mode, the NSSMF searches for instantiation information of the AMF instance, where the instantiation information of the AMF instance includes a VNFD ID corresponding to an AMF and an identifier of the AMF instance.

If the deployment mode is a sharing mode, the first network slice may be deployed by using the AMF instance shared by the at least two network slice instances or the AMF instance of the one network slice instance, and therefore creation of a new AMF instance is not required. This can save resources and improve utilization of a network function instance.

The NSSMF directly uses the existing AMF instance by searching for the instantiation information of the AMF instance, where the instantiation information of the AMF instance includes the VNFD ID corresponding to the AMF and the identifier of the AMF instance.

In step S605, the NSSMF sends a network service instantiation requirement to a MANO, where the network service instantiation requirement includes an NSD ID and the instantiation information of the AMF instance. Correspondingly, the MANO receives the network service instantiation requirement from the NSSMF.

The network service instantiation requirement is used to request the MANO to perform virtual resource instantiation on a network function other than the AMF.

In step S606, the MANO instantiates the network function other than the AMF.

When receiving the network service instantiation requirement, the MANO performs virtual resource instantiation on the network function other than the AMF.

In step S607, the MANO sends network service instantiation information to the NSSMF, where the network service instantiation information includes a network service instance identifier, the VNFD ID, and a VNF instance ID corresponding to the VNFD ID. Correspondingly, the NSSMF receives the network service instantiation information from the MANO.

When completing the virtual resource instantiation, the MANO sends the network service instantiation information to the NSSMF. The network service instantiation information is a response to the network service instantiation requirement, and includes the network service instance identifier, a plurality of VNFD IDs, and VNF instance IDs corresponding to the VNFD IDs.

In step S608, the NSSMF records the network service instantiation information, where the network service instantiation information includes the network service instance identifier, the VNFD IDs, and the VNF instance IDs corresponding to the VNFD IDs.

When receiving the network service instantiation information, the NSSMF records the network service instantiation information. The network service instantiation information includes the network service instance identifier, the VNFD IDs, and the VNF instance IDs corresponding to the VNFD IDs.

The NSSMF establishes a network topology between VNF instances based on VNFDs, that is, establishes a network topology between the AMF instance and another network function instance.

In step S609, the NSSMF determines whether the AMF instance needs to be modified.

The NSSMF determines whether the AMF instance shared by the at least two network slice instances or the AMF instance of the one network slice instance needs to be modified.

The NSSMF may determine, based on a performance function of the AMF instance and a performance function of the AMF instance required by the first network slice, whether the AMF instance needs to be modified. The performance function may include a supported user quantity, a bandwidth, a latency, and the like. If the performance function of the AMF instance cannot meet the performance function of the AMF instance required by the first network slice, the NSSMF may be determined that the AMF instance needs to be modified.

For example, the AMF instance of the network slice instance 1 can support 18 users, and the AMF instance required by the first network slice needs to support 60,000 users. In this case, it may be determined that when the first network slice is deployed by using the AMF instance of the network slice instance 1, the supported user quantity of the AMF instance needs to be modified to 60,000.

In step S610, if the AMF instance needs to be modified, the NSSMF sends a network service modification request to the MANO, where the network service modification request is used to request the MANO to modify a resource of the AMF instance. Correspondingly, the MANO receives the network service modification request from the NSSMF.

When determining that the AMF instance needs to be modified, the NSSMF sends the network service modification request to the MANO. When receiving the network service modification request, the MANO modifies the resource of the AMF instance.

In step S610a, the MANO sends a network service modification response to the NSSMF.

When completing the resource modification of the AMF instance, the MANO may feed back the network service modification response to the NSSMF in response to the network service modification request, to notify the NSSMF that the resource of the AMF instance has been modified.

In step S611, the NSSMF sends a configuration modification request to an AMF network element, where the configuration modification request is used to request the AMF network element to modify a configuration of the AMF instance.

The NSSMF sends the network service modification request to the MANO, and further sends the configuration modification request to the AMF network element. The AMF network element is the AMF instance, namely, the AMF instance that needs to be shared by the first network slice. When receiving the configuration modification request, the AMF network element modifies the configuration of the AMF instance, to enable the performance function of the AMF network element to meet a requirement of the AMF instance required by the first network slice.

In step S611a, the AMF network element sends a configuration modification response to the NSSMF.

When completing the configuration modification of the AMF instance, the AMF network element feeds back the configuration modification response to the NSSMF in response to the configuration modification request, to notify the NSSMF that the configuration of the AMF instance has been modified.

In step S612, when the AMF instance has been modified, the NSSMF sends network slice subnet instantiation information to the NSMF, where the network slice subnet instantiation information includes the identifier of the first network slice instance and a NSSI ID. Correspondingly, the NSMF receives the network slice subnet instantiation information from the NSSMF.

When the AMF instance has been modified, that is, when the NSSMF receives the network service modification response fed back by the MANO and the configuration modification response fed back by the AMF network element, the NSSMF sends the network slice subnet instantiation information to the NSMF in response to a network slice subnet instantiation requirement. The network slice subnet instantiation information includes the identifier of the first network slice instance and the NSSI ID. The network slice subnet instantiation information further includes a VNF type and the VNF instance ID.

In step S613, the NSMF records the network slice subnet instantiation information.

When receiving the network slice subnet instantiation information, the NSMF records the identifier of the first network slice instance and the NSSI ID corresponding to the first network slice instance. In this way, a correspondence between the first network slice instance and the NSSI corresponding to the first network slice is established.

The NSMF further records the VNF type and the VNF instance ID that are included in the NSSI.

In step S614, the NSMF sends network slice instantiation information to the CSMF, where the network slice instantiation information includes a tenant identifier of the first network slice and the identifier of the first network slice instance.

When receiving the network slice subnet instantiation information, the NSMF sends the network slice instantiation information to the CSMF. The network slice instantiation information is a response to a network slice instantiation requirement, and includes the tenant identifier of the first network slice and the identifier of the first network slice instance.

When receiving the network slice instantiation information, the CSMF records the identifier of the first network slice instance.

In the embodiment shown in FIG. 6A and FIG. 6B, a process of deploying the subsequent network slice after the plurality of coexistence network slices is described. In this process, it is determined, based on the coexistence relationship information, that the deployment mode of the AMF instance required by the first network slice is a sharing mode, so that the first network slice is deployed by using the existing AMF instance. This improves network function utilization and network slice management efficiency.

Figure 7:
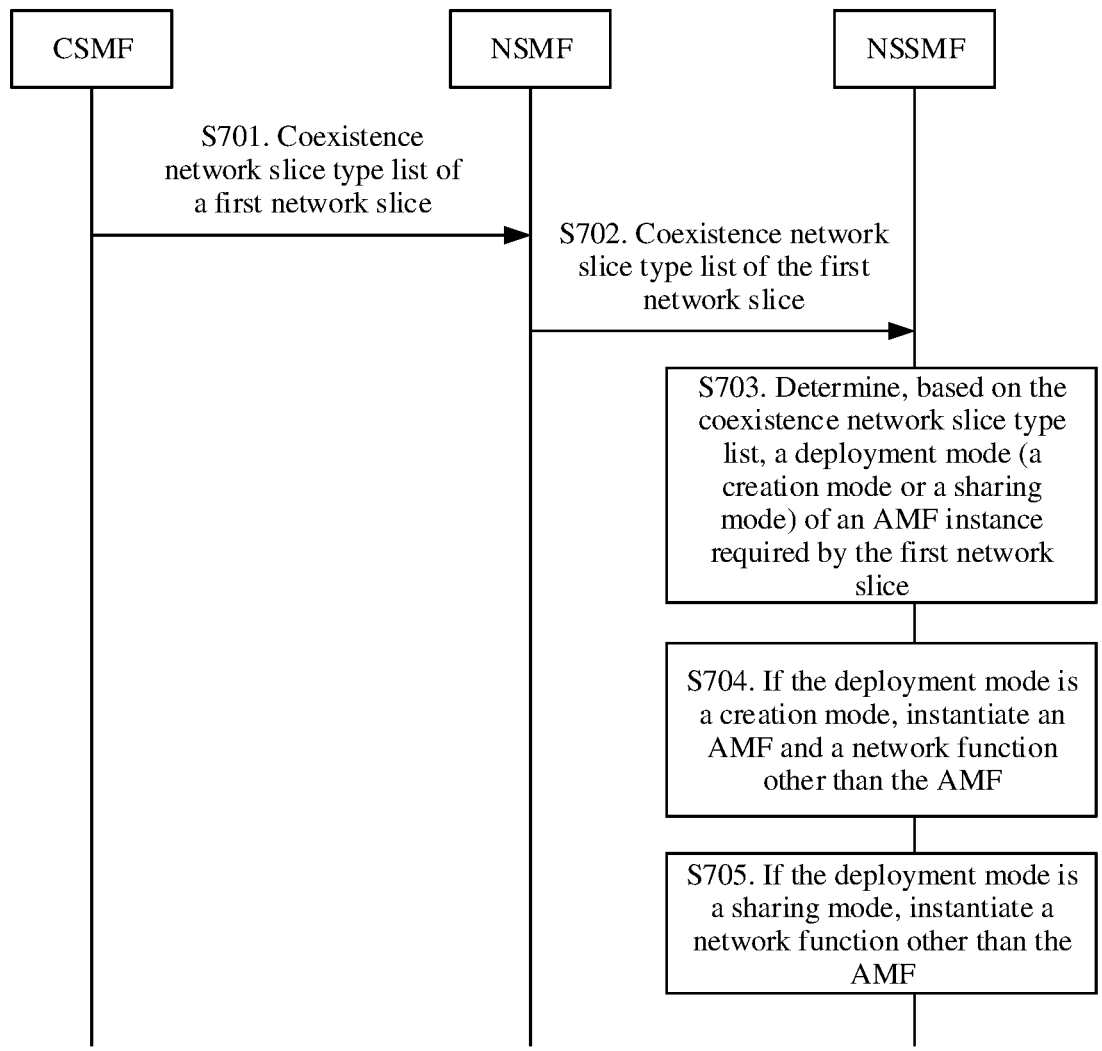
FIG. 7 is a schematic interaction flowchart 3 of a network slice deployment method according to an embodiment.

FIG. 7 is a schematic interaction flowchart 3 of a network slice deployment method according to an embodiment. The method may include but is not limited to the following steps.

In step S701, a CSMF sends a coexistence network slice type list of a first network slice to an NSMF. Correspondingly, the NSMF receives the coexistence network slice type list from the CSMF.

A difference between step 701 and step S601 lies in that the coexistence relationship information in step S601 includes an empty coexistence network slice instance list, and the coexistence relationship information in step S701 does not include a coexistence network slice instance list.

In step S702, the NSMF sends the coexistence network slice type list of the first network slice to an NSSMF. Correspondingly, the NSSMF receives the coexistence network slice type list from the NSMF.

In step S703, the NSSMF determines, based on the coexistence network slice type list, a deployment mode (a creation mode or a sharing mode) of an AMF instance required by the first network slice.

The NSSMF determines, based on the coexistence network slice type list, whether a network slice instance corresponding to a slice type of a second network slice exists. For example, if the coexistence network slice type list is expressed as Co-existenceSlicetypelists=((Tenant ID 1, A), (tenant ID 2, B),(tenant ID 3, C)), and a slice type of the first network slice is A, the NSSMF determines whether a network slice instance corresponding to a slice type B and a network slice instance corresponding to a slice type C exist.

If the network slice instance corresponding to the slice type of the second network slice exists, the NSSMF determines that the deployment mode of the AMF instance required by the first network slice is a sharing mode. For example, if the network slice instance corresponding to the slice type B and the network slice instance corresponding to the slice type C exist, the NSSMF determines that the deployment mode of the AMF instance required by the first network slice is a sharing mode.

If the network slice instance corresponding to the slice type of the second network slice does not exist, the NSSMF determines that the deployment mode of the AMF instance required by the first network slice is a creation mode.

In step S704, if the deployment mode is a creation mode, the NSSMF instantiates an AMF and a network function other than the AMF.

If the determined deployment mode is a creation mode, the NSSMF instantiates the AMF required by the first network slice and the network function other than the AMF. For details, refer to step S504 to step 508 in the embodiment shown in FIG. 5. Details are not described herein again.

In step S705, if the deployment mode is a sharing mode, the NSSMF instantiates the network function other than the AMF.

If the determined deployment mode is a sharing mode, the NSSMF searches for instantiation information of the AMF instance, and instantiates the network function other than the AMF required by the first network slice. For details, refer to step S604 to step S612 in the embodiment shown in FIG. 6A and FIG. 6B. Details are not described herein again.

In the embodiment shown in FIG. 7, the coexistence network slice instance list is not carried, and the NSSMF directly determines, based on the coexistence network slice type list, the deployment mode of the AMF instance required by the first network slice. This helps improve network slice management efficiency.

Figure 8A:
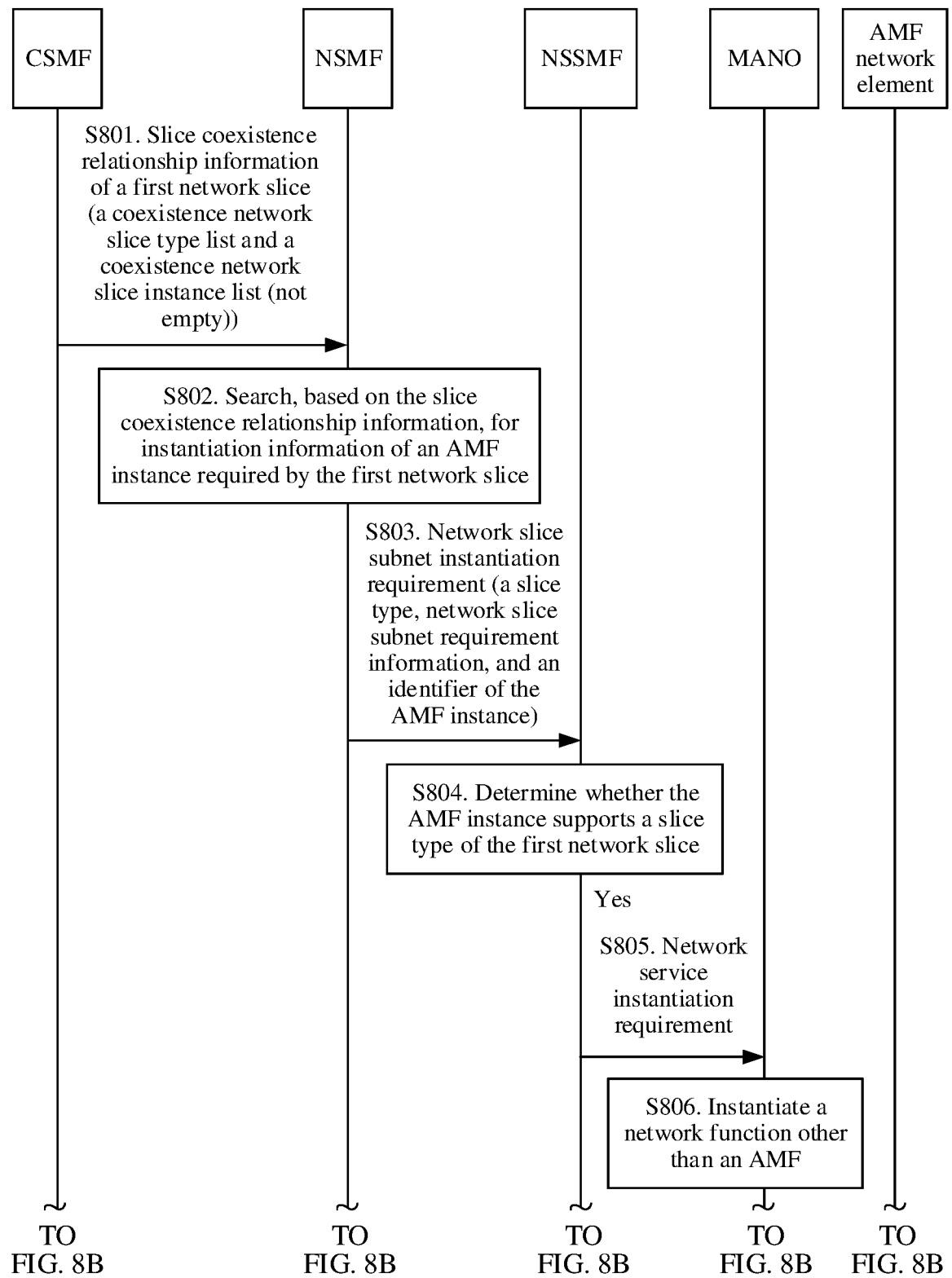
FIG. 8A is a schematic interaction flowchart 4 of a network slice deployment method according to an embodiment.
Figure 8B:
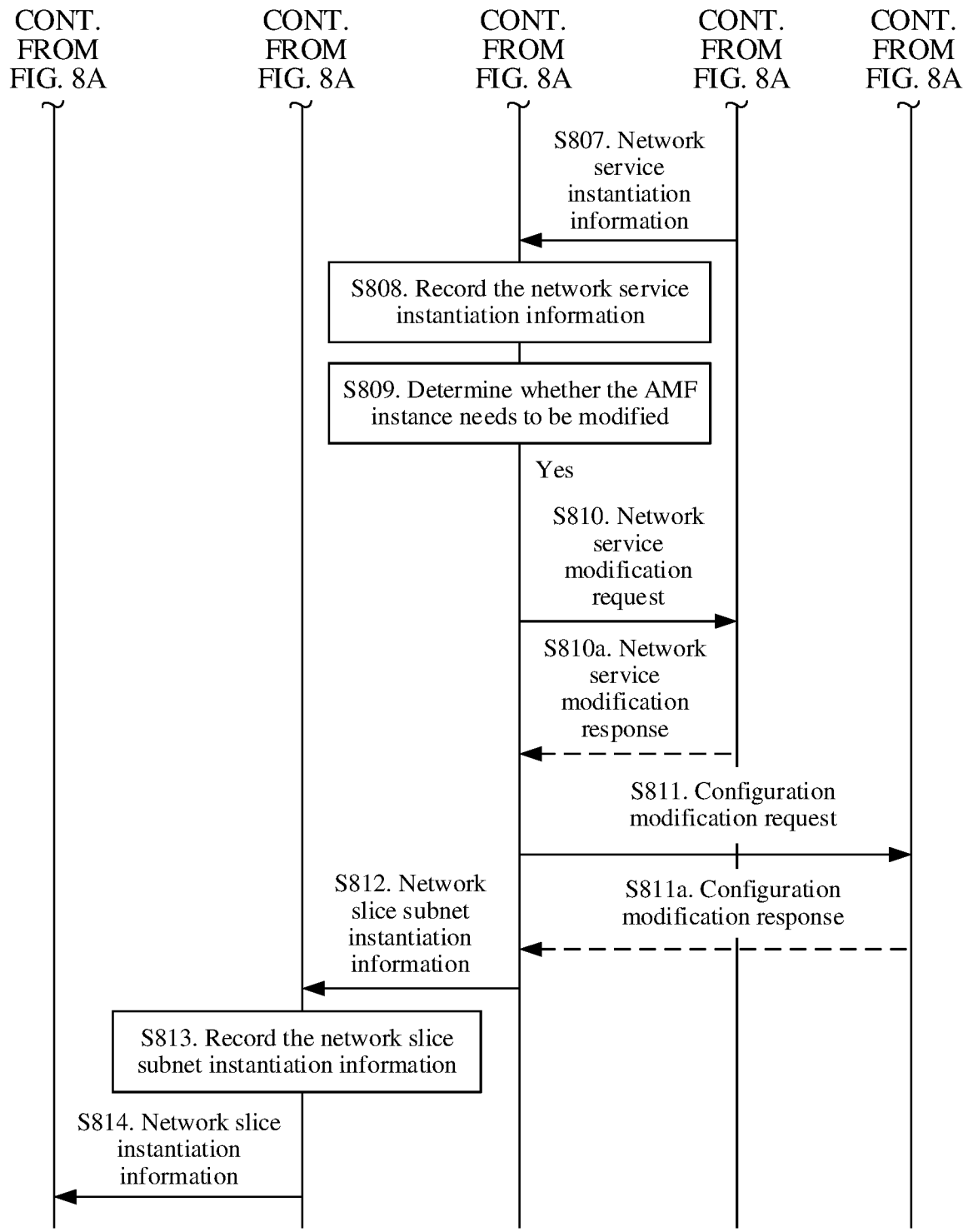
FIG. 8B is a schematic interaction flowchart 4 of a network slice deployment method according to an embodiment.

FIG. 8A and FIG. 8B are a schematic interaction flowchart 4 of a network slice deployment method according to an embodiment. The method may include but is not limited to the following steps.

In step S801, a CSMF sends slice coexistence relationship information of a first network slice to an NSMF, where the slice coexistence relationship information includes a coexistence network slice type list and a coexistence network slice instance list. Correspondingly, the NSMF receives the slice coexistence relationship information from the CSMF.

If the first network slice is the first network slice in a plurality of coexistence network slices, the coexistence network slice instance list is empty. If the first network slice is a subsequent network slice after the plurality of coexistence network slices, the coexistence network slice instance list is not empty. It is assumed that the first network slice in the embodiment shown in FIG. 8A and FIG. 8B is the subsequent network slice after the plurality of coexistence network slices.

In step S802, the NSMF searches, based on the slice coexistence relationship information, for instantiation information of an AMF instance required by the first network slice, where the instantiation information of the AMF instance includes an identifier of the AMF instance corresponding to an AMF.

The NSMF searches, based on the coexistence network slice type list, the coexistence network slice instance list, and a slice type of the first network slice, for the instantiation information of the AMF instance required by the first network slice. The instantiation information of the AMF instance includes the identifier of the AMF instance.

In step S508 in the embodiment shown in FIG. 5, the NSMF records an identifier of a first network slice instance and an NSSI ID corresponding to the first network slice instance, and further records a VNF type and a VNF instance ID. Therefore, the NSMF may search for the identifier of the AMF instance based on the coexistence relationship information.

In step S803, the NSMF sends a network slice subnet instantiation requirement to an NSSMF, where the network slice subnet instantiation requirement includes the slice type of the first network slice, network slice subnet requirement information, and the identifier of the AMF instance. Correspondingly, the NSSMF receives the network slice subnet instantiation requirement from the NSMF.

The network slice subnet instantiation requirement further includes the VNF type, where the VNF type is AMF, that is, VNF type=AMF. In other words, a type of a shared network function is AMF.

The network slice subnet instantiation requirement further includes a tenant identifier of the first network slice, the identifier of the first network slice instance, and a network slice isolation flag.

In step S804, the NSSMF determines whether the AMF instance supports the slice type of the first network slice.

When receiving the network slice subnet instantiation requirement, the NSSMF determines whether the AMF instance supports the slice type of the first network slice.

In step S805, if the slice type of the first network slice is supported, the NSSMF sends a network service instantiation requirement to a MANO, where the network service instantiation requirement includes an NSD, a VNFD corresponding to the AMF, and the identifier of the AMF instance. Correspondingly, the MANO receives the network service instantiation requirement from the NSSMF.

If the slice type of the first network slice is not supported, the NSSMF sends a failure message to the NSMF, where the failure message includes the identifier of the first network slice instance and a failure cause, and the failure cause is that the AMF instance does not support the slice type of the first network slice.

In step S806, the MANO instantiates a network function other than the AMF.

In step S807, the MANO sends network service instantiation information to the NSSMF, where the network service instantiation information includes a network service instance identifier, a VNFD ID, and a VNF instance ID corresponding to the VNFD ID. Correspondingly, the NSSMF receives the network service instantiation information from the MANO.

In step S808, the NSSMF records the network service instantiation information, where the network service instantiation information includes the network service instance identifier, the VNFD IDs, and the VNF instance ID corresponding to the VNFD ID.

In step S809, the NSSMF determines whether the AMF instance needs to be modified.

In step S810, if the AMF instance needs to be modified, the NSSMF sends a network service modification request to the MANO, where the network service modification request is used to request the MANO to modify a resource of the AMF instance.

In step S810a, the MANO sends a network service modification response to the NSSMF.

In step S811, the NSSMF sends a configuration modification request to an AMF network element, where the configuration modification request is used to request the AMF network element to modify a configuration of the AMF instance.

In step S811a, the AMF network element sends a configuration modification response to the NSSMF.

In step S812, when the AMF instance has been modified, the NSSMF sends network slice subnet instantiation information to the NSMF, where the network slice subnet instantiation information includes the identifier of the first network slice instance and an NSSI ID. Correspondingly, the NSMF receives the network slice subnet instantiation information from the NSSMF.

The network slice subnet instantiation information further includes the VNF type and the VNF instance ID.

In step S813, the NSMF records the network slice subnet instantiation information.

In step S814, the NSMF sends network slice instantiation information to the CSMF, where the network slice instantiation information includes the tenant identifier of the first network slice and the identifier of the first network slice instance.

For an exemplary implementation process of step S806 to step S814, refer to the exemplary descriptions of step S606 to step S614 in the embodiment shown in FIG. 6A and FIG. 6B. Details are not described herein again.

In the embodiment shown in FIG. 8A and FIG. 8B, the NSMF searches for the instantiation information of the AMF instance. If the instantiation information of the AMF instance is found, the NSMF determines that the deployment mode of the AMF instance required by the first network slice is a sharing mode. When the NSSMF determines that the AMF instance supports the slice type of the first network slice, the first network slice is deployed by using the AMF instance. This improves network function utilization and network slice management efficiency.

The foregoing describes in detail the method in the embodiments. The following provides apparatuses in the embodiments.

Figure 9:
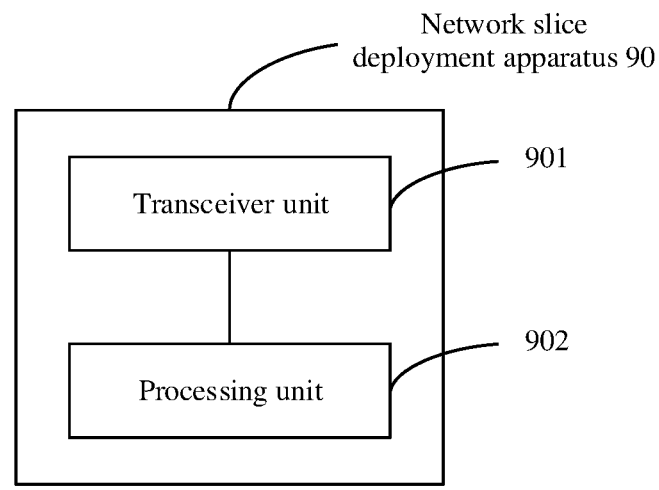
FIG. 9 is a schematic diagram of a logical structure of a network slice deployment apparatus according to an embodiment.

FIG. 9 is a schematic diagram of a logical structure of a network slice deployment apparatus according to an embodiment. The network slice deployment apparatus 90 may include a transceiver unit 901 and a processing unit 902.

The transceiver unit 901 is configured to obtain slice coexistence relationship information of a first network slice, where the slice coexistence relationship information is used to indicate information about a second network slice that has a slice coexistence relationship with the first network slice.

The processing unit 902 is configured to determine, based on the slice coexistence relationship information, a deployment mode of a network function entity required by the first network slice.

The processing unit 902 is further configured to deploy the network function entity in the deployment mode.

The transceiver unit 901 is configured to perform step S401 in the embodiment shown in FIG. 4, and the processing unit 902 is configured to perform step S402 and step S403 in the embodiment shown in FIG. 4.

The network slice deployment apparatus 90 may be the NSMF or the NSSMF in the embodiments shown in FIG. 5 to FIG. 8B.

If the network slice deployment apparatus 90 is the NSMF in the embodiments shown in FIG. 5 to FIG. 8B, the transceiver unit 901 may be configured to communicate with the CSMF and the NSSMF, for example, to perform step S501, step S502, step S508, and step S510 in the embodiment shown in FIG. 5, perform step S601, step S602, step S612, and step S614 in the embodiment shown in FIG. 6A and FIG. 6B, perform step S701 and step S702 in the embodiment shown in FIG. 7, and perform step S801, step S803, step S812, and step S814 in the embodiment shown in FIG. 8A and FIG. 8B. The processing unit 902 may be configured to perform NSMF-controlled operations, for example, perform step S509 in the embodiment shown in FIG. 5, perform step S613 in the embodiment shown in FIG. 6B, and perform step S802 and step S813 in the embodiment shown in FIG. 8A and FIG. 8B. For details, refer to the corresponding descriptions in the embodiments shown in FIG. 5 to FIG. 8B. Details are not described herein again.

If the network slice deployment apparatus 90 is the NSSMF in the embodiments shown in FIG. 5 to FIG. 8B, the transceiver unit 901 may be configured to communicate with the NSMF, the MANO, and the AMF network element, for example, to perform step S502, step S504, step S506, and step S508 in the embodiment shown in FIG. 5, perform step S602, step S605, step S607, step S610, step S610a, step S611, step S611a, and step S612 in the embodiment shown in FIG. 6A and FIG. 6B, perform step S702 in the embodiment shown in FIG. 7, and perform step S803, step S805, step S807, step S810, step S810a, step S811, step S811a, and step S812 in the embodiment shown in FIG. 8A and FIG. 8B. The processing unit 902 may be configured to perform NSSMF-controlled operations, for example, perform step S503 and step S507 in the embodiment shown in FIG. 5, and perform step S603, step S604, step S608, and step S609 in the embodiment shown in FIG. 6A and FIG. 6B, perform step S703, step S704, and step S705 in the embodiment shown in FIG. 7, and perform step S804, step S808, and step S809 in the embodiment shown in FIG. 8A and FIG. 8B. For details, refer to the corresponding descriptions in the embodiments shown in FIG. 5 to FIG. 8B. Details are not described herein again.

Figure 10:
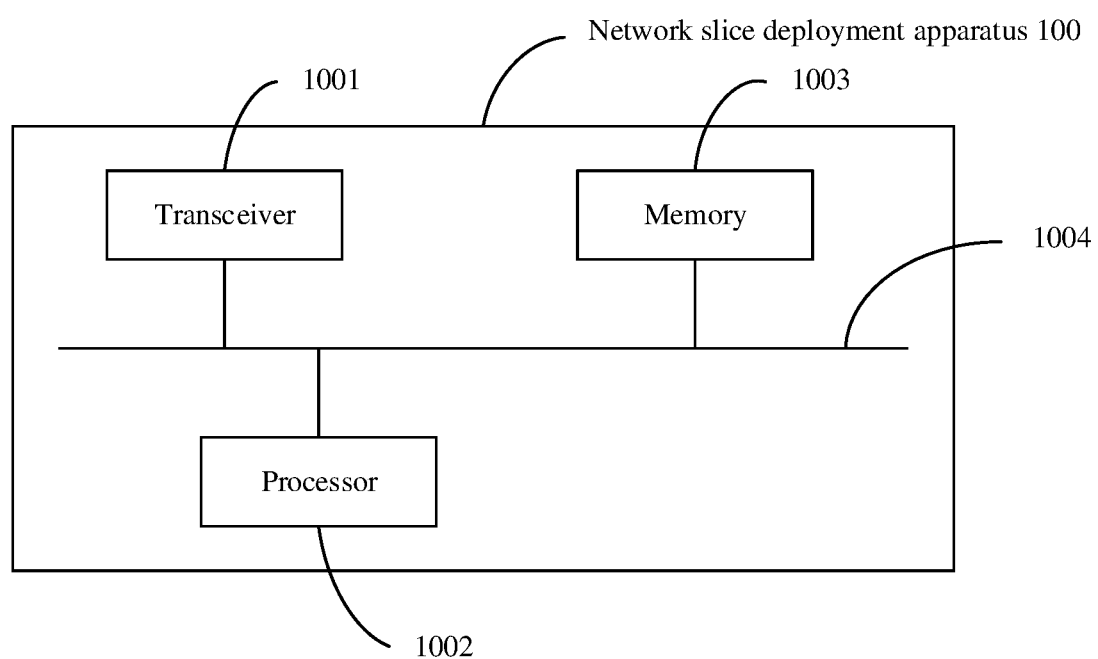
FIG. 10 is a simplified schematic diagram of an entity structure of a network slice deployment apparatus according to an embodiment.

FIG. 10 is a simplified schematic structural diagram of a network slice deployment apparatus according to an embodiment. The network slice deployment apparatus 100 includes a transceiver 1001, a processor 1002, and a memory 1003. The transceiver 1001, the processor 1002, and the memory 1003 may be connected to each other through the bus 1004 or may be connected to each other in another manner. A related function implemented by the transceiver unit 901 shown in FIG. 9 may be implemented by the transceiver 1001. A related function implemented by the processing unit 902 shown in FIG. 9 may be implemented through one or more processors 1002.

The memory 1003 includes but is not limited to a random access memory (RAM), a read-only memory (ROM), an erasable programmable read-only memory (EPROM), or a compact disc read-only memory (CD-ROM). The memory 1003 is configured to store a related instruction and related data.

The transceiver 1001 is configured to send data and/or signals, and receive data and/or signals. The transceiver 1001 is configured to perform step S401 in the embodiment shown in FIG. 4.

If the network slice deployment apparatus 100 is the NSMF in the embodiments shown in FIG. 5 to FIG. 8B, the transceiver 1001 may be configured to communicate with the CSMF and the NSSMF, for example, to perform step S501, step S502, step S508, and step S510 in the embodiment shown in FIG. 5, perform step S601, step S602, step S612, and step S614 in the embodiment shown in FIG. 6A and FIG. 6B, perform step S701 and step S702 in the embodiment shown in FIG. 7, and perform step S801, step S803, step S812, and step S814 in the embodiment shown in FIG. 8A and FIG. 8B.

If the network slice deployment apparatus 100 is the NSSMF in the embodiments shown in FIG. 5 to FIG. 8B, the transceiver 1001 may be configured to communicate with the NSMF, the MANO, and the AMF network element, for example, to perform step S502, step S504, step S506, and step S508 in the embodiment shown in FIG. 5, perform step S602, step S605, step S607, step S610, step S610a, step S611, step S611a, and step S612 in the embodiment shown in FIG. 6A and FIG. 6B, perform step S702 in the embodiment shown in FIG. 7, and perform step S803, step S805, step S807, step S810, step S810a, step S811, step S811a, and step S812 in the embodiment shown in FIG. 8A and FIG. 8B.

The processor 1002 may include one or more processors, for example, include one or more central processing units (CPU). When the processor 1002 is one CPU, the CPU may be a single-core CPU or a multi-core CPU. The processor 1002 is configured to perform step S402 and step S403 in the embodiment shown in FIG. 4.

If the network slice deployment apparatus 100 is the NSMF in the embodiments shown in FIG. 5 to FIG. 8B, the processor 1002 may be configured to perform NSMF-controlled operations, for example, perform step S509 in the embodiment shown in FIG. 5, perform step S613 in the embodiment shown in FIG. 6B, and perform step S802 and step S813 in the embodiment shown in FIG. 8A and FIG. 8B. For details, refer to the corresponding descriptions in the embodiments shown in FIG. 5 to FIG. 8B. Details are not described herein again.

If the network slice deployment apparatus 100 is the NSSMF in the embodiments shown in FIG. 5 to FIG. 8B, the processor 1002 may be configured to perform NSSMF-controlled operations, for example, perform step S503 and step S507 in the embodiment shown in FIG. 5, perform step S603, step S604, step S608, and step S609 in the embodiment shown in FIG. 6A and FIG. 6B, perform step S703, step S704, and step S705 in the embodiment shown in FIG. 7, and perform step S804, step S808, and step S809 in the embodiment shown in FIG. 8A and FIG. 8B.

The memory 1003 is configured to store program code and data of the network slice deployment apparatus 100.

For details of steps performed by the processor 1002 and the transceiver 1001, refer to the descriptions in the embodiments shown in FIG. 5 to FIG. 8B. Details are not described herein again.

It may be understood that FIG. 10 shows only a simplified design of the network slice deployment apparatus. In actual application, the network slice deployment apparatus may further include other necessary components, including but not limited to any quantity of transceivers, processors, controllers, memories, communications units, or the like. All devices that can implement this application fall within the protection scope.

An embodiment further provides a network slice deployment system, including the NSMF, the NSSMF, the CSMF, and the NFV-MANO shown in FIG. 2, and further including the AMF network element in the embodiments shown in FIG. 6A, FIG. 6B, and FIG. 7.

A person of ordinary skill in the art may understand that all or some of the procedures of the methods in the embodiments may be implemented by a computer program instructing relevant hardware. The program may be stored in a computer-readable storage medium. When the program is run, the procedures of the methods in the embodiments are performed. The foregoing storage medium includes: any medium that can store program code, such as a ROM, a RAM, a magnetic disk, or an optical disc. Therefore, another embodiment provides a computer-readable storage medium. The computer-readable storage medium stores an instruction, and when the instruction is run on a computer, the computer is enabled to perform the methods in the foregoing aspects.

Another embodiment further provides a computer program product including an instruction, and when the computer program product runs on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A network slice deployment method, comprising:
obtaining slice coexistence relationship information of a first network slice, wherein the slice coexistence relationship information is used to indicate information about a second network slice that has a slice coexistence relationship with the first network slice;
determining, based on the slice coexistence relationship information, a deployment mode of a network function entity required by the first network slice; and
deploying the network function entity in the deployment mode,
wherein the network function entity required by the first network slice is a mobility management network element,
the slice coexistence relationship information comprises a coexistence network slice type list and a coexistence network slice instance list, the coexistence network slice type list comprises a slice type of the second network slice, and the coexistence network slice instance list comprises a network slice instance identifier corresponding to the existing second network slice, and the determining, based on the slice coexistence relationship information, of the deployment mode of a network function entity required by the first network slice comprises:

when the coexistence network slice instance list is empty, determining, based on the coexistence network slice type list, whether a coexistence network slice instance exists; and when the coexistence network slice instance exists, determining that the deployment mode of the mobility management network element required by the first network slice is a sharing mode, or when the coexistence network slice instance does not exist, determining that the deployment mode of the mobility management network element required by the first network slice is a creation mode.

2. The method of network slice deployment according to claim 1, wherein the slice coexistence relationship information comprises a coexistence network slice type list, and the coexistence network slice type list comprises a slice type of the second network slice.

3. The method of network slice deployment according to claim 2, wherein the determining, based on the slice coexistence relationship information, of the deployment mode of a network function entity required by the first network slice comprises:

determining whether a network slice instance corresponding to the slice type of the second network slice exists; and when the network slice instance corresponding to the slice type of the second network slice exists, determining that the deployment mode of the mobility management network element required by the first network slice is a sharing mode; or when the network slice instance corresponding to the slice type of the second network slice does not exist, determining that the deployment mode of the mobility management network element required by the first network slice is a creation mode.

4. The method of network slice deployment according to claim 1, wherein the determining, based on the slice coexistence relationship information, of the deployment mode of a network function entity required by the first network slice comprises:

when the coexistence network slice instance list comprises at least two network slice instance identifiers, determining whether at least two network slice instances corresponding to the at least two network slice instance identifiers share a mobility management network element;

when the at least two network slice instances share a mobility management network element, determining whether the mobility management network element shared by the at least two network slice instances supports a slice type of the first network slice; and when the slice type of the first network slice is supported, determining that the deployment mode of the mobility management network element required by the first network slice is a sharing mode.

5. The method of network slice deployment according to claim 1, wherein the determining, based on the slice coexistence relationship information, of the deployment mode of a network function entity required by the first network slice comprises:

when the coexistence network slice instance list comprises one network slice instance identifier, determining whether a mobility management network element of a network slice instance corresponding to the one network slice instance identifier supports a slice type of the first network slice; and when the slice type of the first network slice is supported, determining that the deployment mode of the mobility management network element required by the first network slice is a sharing mode.

6. The method of network slice deployment according to claim 4, wherein after the determining of whether the mobility management network element shared by the at least two network slice instances supports a slice type of the first network slice, the method further comprises:

when the mobility management network element shared by the at least two network slice instances does not support the slice type of the first network slice, sending a failure message that carries a failure cause.

7. The method of network slice deployment according to claim 1, wherein the coexistence network slice type list further comprises a tenant identifier of the second network slice.

8. A network slice deployment apparatus, comprising: a processor and a transceiver, wherein the transceiver is configured to obtain slice coexistence relationship information of a first network slice, and the slice coexistence relationship information is used to indicate information about a second network slice that has a slice coexistence relationship with the first network slice;

the processor is configured to determine, based on the slice coexistence relationship information, a deployment mode of a network function entity required by the first network slice; and the processor is further configured to deploy the network function entity in the deployment mode, wherein the network function entity required by the first network slice is a mobility management network element, the slice coexistence relationship information comprises a coexistence network slice type list and a coexistence network slice instance list, the coexistence network slice type list comprises a slice type of the second network slice, and the coexistence network slice instance list comprises a network slice instance identifier corresponding to the existing second network slice, and wherein when the processor is configured to determine, based on the slice coexistence relationship information, the deployment mode of the network function entity required by the first network slice, the processor is specifically configured to: when the coexistence network slice instance list is empty, determine, based on the coexistence network slice type list, whether a coexistence network slice instance exists; and, when the coexistence network slice instance exists, determine that the deployment mode of the mobility management network element required by the first network slice is a sharing mode; or, when the coexistence network slice instance does not exist, determine that the deployment mode of the mobility management network element required by the first network slice is a creation mode.

9. The network slice deployment apparatus according to claim 8, wherein the slice coexistence relationship information comprises a coexistence network slice type list, and the coexistence network slice type list comprises a slice type of the second network slice.

10. The network slice deployment apparatus according to claim 9, wherein when the processor is configured to determine, based on the slice coexistence relationship information, the deployment mode of the network function entity required by the first network slice, the processor is specifically configured to: determine whether a network slice instance corresponding to the slice type of the second network slice exists; and, when the network slice instance corresponding to the slice type of the second network slice exists, determine that the deployment mode of the mobility management network element required by the first network slice is a sharing mode; or, when the network slice instance corresponding to the slice type of the second network slice does not exist, determine that the deployment mode of the mobility management network element required by the first network slice is a creation mode.

11. The network slice deployment apparatus according to claim 8, wherein when the processor is configured to determine, based on the slice coexistence relationship information, the deployment mode of the network function entity required by the first network slice, the processor is specifically configured to: when the coexistence network slice instance list comprises at least two network slice instance identifiers, determine whether at least two network slice instances corresponding to the at least two network slice instance identifiers share a mobility management network element; when the at least two network slice instances share a mobility management network element, determine whether the mobility management network element shared by the at least two network slice instances supports a slice type of the first network slice; and, when the slice type of the first network slice is supported, determine that the deployment mode of the mobility management network element required by the first network slice is a sharing mode.

12. The network slice deployment apparatus according to claim 8, wherein when the processor is configured to determine, based on the slice coexistence relationship information, the deployment mode of the network function entity required by the first network slice, the processor is specifically configured to: when the coexistence network slice instance list comprises one network slice instance identifier, determine whether a mobility management network element of a network slice instance corresponding to the one network slice instance identifier supports a slice type of the first network slice; and, when the slice type of the first network slice is supported, determine that the deployment mode of the mobility management network element required by the first network slice is a sharing mode.

13. The network slice deployment apparatus according to claim 11, wherein the processor is further configured to: after determining whether the mobility management network element shared by the at least two network slice instances supports the slice type of the first network slice, when the mobility management network element shared by the at least two network slice instances does not support the slice type of the first network slice, send a failure message that carries a failure cause.

14. The network slice deployment apparatus according to claim 8, wherein the coexistence network slice type list further comprises a tenant identifier of the second network slice.

* * * * *